United States Patent
Gadkaree et al.

(10) Patent No.: US 10,014,704 B2
(45) Date of Patent: Jul. 3, 2018

(54) INTEGRATED ENERGY AND POWER DEVICE

(71) Applicant: CORNING INCORPORATED, Corning, NY (US)

(72) Inventors: Kishor Purushottam Gadkaree, Painted Post, NY (US); Rahul Suryakant Kadam, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/610,706

(22) Filed: Jan. 30, 2015

(65) Prior Publication Data

US 2016/0226281 A1 Aug. 4, 2016

(51) Int. Cl.
  *H02J 7/00* (2006.01)
  *H01G 11/06* (2013.01)
  (Continued)

(52) U.S. Cl.
  CPC .......... *H02J 7/0052* (2013.01); *H01G 11/06* (2013.01); *H01G 11/32* (2013.01); *H01G 11/50* (2013.01);
  (Continued)

(58) Field of Classification Search
  CPC ........ H01G 11/02; H01G 11/04; H01G 11/06; H01G 11/28; H01G 11/22; H01G 11/32;
  (Continued)

(56) References Cited

U.S. PATENT DOCUMENTS

| | | | |
|---|---|---|---|
| 5,439,756 A | 8/1995 | Anani et al. | |
| 2002/0041174 A1* | 4/2002 | Purkey | F02N 11/14 320/103 |

(Continued)

FOREIGN PATENT DOCUMENTS

| | | |
|---|---|---|
| EP | 2017911 | 1/2009 |
| EP | 2958122 | 12/2015 |

(Continued)

OTHER PUBLICATIONS

International Search Report, issued in connection with corresponding PCT application No. PCT/US2016/015045, dated Apr. 14, 2016.
(Continued)

*Primary Examiner* — Mark F. Huff
*Assistant Examiner* — Omar M Kekia
(74) *Attorney, Agent, or Firm* — Shantanu Pathak

(57) ABSTRACT

A lithium ion energy and power system including:
  a housing containing:
    at least three electrodes including:
      at least one first electrode including a cathodic faradaic energy storage material;
      at least one second electrode including an anodic faradaic energy storage material; and
      at least one third electrode including a cathodic non-faradaic energy storage material, wherein the at least one first, second, and third electrodes are adjacent as defined herein, and the at least one second electrode is electrically isolated from the electrically coupled at least one first electrode and the at least one third electrode;
    a separator between the electrodes; and
    a liquid electrolyte between the electrodes.
Also disclosed is a method of making and using the disclosed lithium ion energy and power system.

20 Claims, 11 Drawing Sheets

(51) Int. Cl.
    *H01G 11/32* (2013.01)
    *H01M 4/505* (2010.01)
    *H01M 4/525* (2010.01)
    *H01M 4/587* (2010.01)
    *H01M 12/00* (2006.01)
    *H01G 11/50* (2013.01)
    *H01G 11/58* (2013.01)
    *H01G 11/68* (2013.01)
    *H01G 11/72* (2013.01)
    *H01M 4/131* (2010.01)
    *H01M 4/133* (2010.01)
    *H01M 4/136* (2010.01)
    *H01M 4/58* (2010.01)
    *H01M 16/00* (2006.01)
    *H01M 10/44* (2006.01)
    *H01M 4/02* (2006.01)
    *H01M 10/42* (2006.01)

(52) U.S. Cl.
    CPC ............. *H01G 11/58* (2013.01); *H01G 11/68* (2013.01); *H01G 11/72* (2013.01); *H01M 4/131* (2013.01); *H01M 4/133* (2013.01); *H01M 4/136* (2013.01); *H01M 4/505* (2013.01); *H01M 4/525* (2013.01); *H01M 4/587* (2013.01); *H01M 4/5825* (2013.01); *H01M 12/005* (2013.01); *H01M 16/00* (2013.01); *H01M 10/4264* (2013.01); *H01M 10/441* (2013.01); *H01M 2004/021* (2013.01); *H01M 2300/0025* (2013.01)

(58) Field of Classification Search
    CPC ........ H01G 11/66; H01G 11/50; H01G 11/72; H01G 11/68; H01G 11/58; H01M 2/02; H01M 4/131; H01M 4/133; H01M 4/134; H01M 4/386; H01M 4/387; H01M 4/485; H01M 4/50; H01M 4/52; H01M 4/505; H01M 4/525; H01M 4/587; H01M 10/441; H01M 12/005; H01M 2004/021; H01M 10/4264; H01M 2300/0025; H01M 16/00; H01M 4/5825; H01M 4/136; H02J 7/0052

USPC ........................................................... 429/7
    See application file for complete search history.

(56) References Cited

U.S. PATENT DOCUMENTS

| | | | |
|---|---|---|---|
| 2004/0179328 A1* | 9/2004 | Ando | H01G 11/06 361/504 |
| 2007/0201185 A1* | 8/2007 | Yoshio | H01G 9/155 361/502 |
| 2008/0165471 A1* | 7/2008 | Kojima | H01G 11/50 361/503 |
| 2009/0148759 A1 | 6/2009 | Mitsuda | |
| 2010/0123096 A1* | 5/2010 | Suzuki | H01M 4/131 252/182.1 |
| 2012/0045695 A1* | 2/2012 | Sheem | H01M 4/133 429/231.8 |
| 2013/0194721 A1* | 8/2013 | Cho | H01G 9/0425 361/502 |
| 2014/0134438 A1 | 5/2014 | Gadkaree et al. | |
| 2016/0087263 A1 | 3/2016 | Gadkaree et al. | |

FOREIGN PATENT DOCUMENTS

| | | |
|---|---|---|
| JP | 2007018889 | 1/2007 |
| JP | 2010020921 | 1/2010 |

OTHER PUBLICATIONS

Sioe Yao Kan, et al., "The use of battery—capacitor combinations in photovoltaic powered products", Journal of Power Sources, 162, 2006, pp. 971-974.

P. Patel, "A Battery-Ultracapacitor Hybrid", http://www.technologyreview.com/news/417053/a-battery-ultracapacitor-hybrid/—accessed Dec. 15, 2014.

Wendy G. Pell et al., Peculiarities and requirements of asymmetric capacitor devices based on combination of capacitor and bsattery-type electrodes, Journal of Power Sources, 136, 2004, pp. 334-345.

A. Vlad, et al., "Hybrid supercapacitor-battery materials for fast electrochemical charge storage", *Scientific Reports* 4, Article No. 4315, 2014, pp. 1-18.

* cited by examiner

US 10,014,704 B2

INTEGRATED ENERGY AND POWER DEVICE

The entire disclosure of each publication or patent document mentioned herein is incorporated by reference.

BACKGROUND

The disclosure relates to a device that provides energy and power advantages.

SUMMARY

In embodiments, the disclosure provides an integrated device that provides superior energy and power outputs, and a method of making and using the integrated energy and power device (IEPD).

BRIEF DESCRIPTION OF THE DRAWINGS

In embodiments of the disclosure.

DETAILED DESCRIPTION

Figure 1:
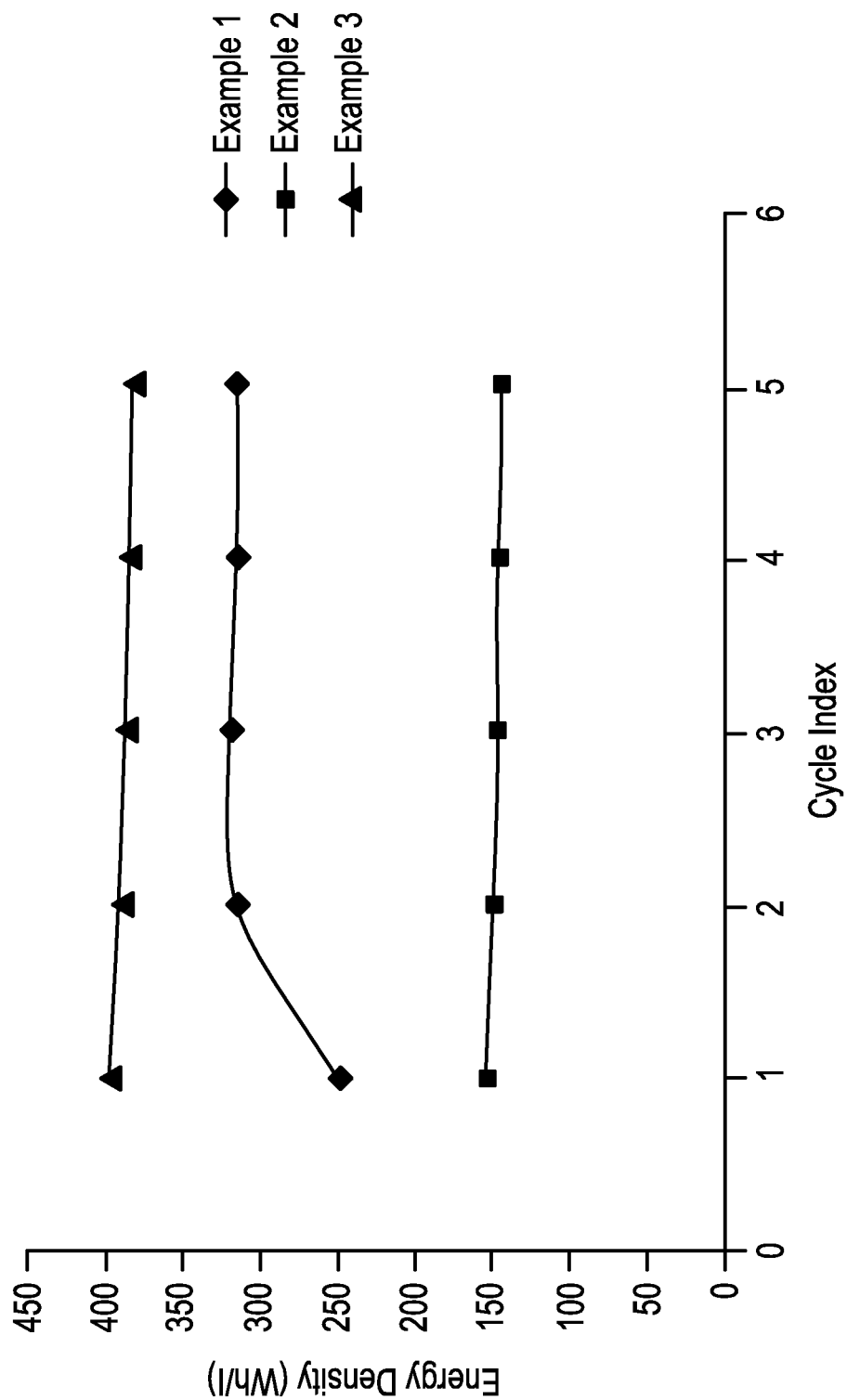
FIG. 1 is a graph showing energy density of the three inventive IEPD devices of Examples 1, 2, and 3, during conditioning.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Integrated" or like terms, in the context of the disclosed integrated energy and power device (IEPD) or the synonymously disclosed energy and power device (EPD), refer to a combination or physical integration into a single device of an energy producing or storage component and a power producing or storage component.

"Faradaic" or like terms refer to a system where current is created by the oxidation or reduction of chemical species present in the system.

"Non-faradaic" or like terms refer to a system where current is created by electrostatic charges adsorbed or desorbed and not by reduction or oxidation of chemical species.

"Cathodic faradaic energy storage material" or like terms refer to positively charged materials that are situated on, or that can be situated on, the cathode during the charging process.

"Anodic faradaic energy storage material" or like terms refer to negatively charged materials that are situated on, or that can be situated on, the anode during the charging process.

"Cathodic non-faradaic energy storage material" or like terms refer to materials which generate current by electrostatic adsorption or desorption of charges.

"Activated carbon," "active carbon," or like terms refer to a carbon derived from a synthetic or natural organic source by first creating a char in an inert environment followed by reacting the carbon with an oxidizing agent, for example, steam or $CO_2$, or alternately, treating the char with an alkali compound such as KOH, NaOH, and like alkali compounds, or an acid such as phosphoric acid. The alkali or acid treatment oxidizes the carbon and creates fine porosity having a large surface area. The treated carbon provides an energy storage material having a double layer storage mechanism.

"Adjacent" or like terms refer to, for example: in close or near proximity; sharing a border; a wall; or a point; facing one another; separated by a distance of from 0.01 to 100 mm, including or excluding the intervening separator member and electrolyte components, or a combination thereof.

"Single electrolyte" or like terms refer, for example: to an ionically conducting composition that is commonly shared among or between one or more of the electrodes.

"Anode," "anode electrode," "negative electrode," or like terms refer to an electrode through which positive electric charge flows into a polarized electrical device and electrons flow out of the electrode to an outside circuit.

"Cathode," "cathode electrode," "positive electrode," or like terms refer to an electrode from which positive electric charge flows out of a polarized electrical device.

"Corning carbon" refers to an activated carbon prepared from a wheat flour precursor as follows. The wheat flour was carbonized at from 650 to 700° C. The carbonized carbon was ground to a particle size of approximately 5 microns. The ground carbonized carbon was then activated at 750° C. with KOH (alkali) in a weight ratio of 2.2:1 KOH:carbon for 2 hrs. The carbon was further washed with water to remove any remaining KOH. The resulting activated carbon was then treated with HCl to neutralize any trace of KOH and then washed with water to neutralize the carbon to a pH of 7. The activated carbon was then heat-treated under nitrogen and hydrogen forming gas at 900° C. for 2 hrs.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

In embodiments, the disclosure provides a lithium ion energy and power system comprising:
  a housing containing:
    at least three electrodes comprising:
      at least one first electrode comprising a cathodic faradaic energy storage material;
      at least one second electrode comprising an anodic faradaic energy storage material; and
      at least one third electrode comprising a cathodic non-faradaic energy storage material, wherein the at least one first electrode is adjacent to the at least one second electrode, and the at least one third electrode is adjacent to the at least one second electrode, and the at least one second electrode, i.e., the faradaic anode or anodic faradaic energy storage material, is electrically isolated from the electrically coupled at least one first electrode, i.e., the faradaic cathode or cathodic faradaic energy storage material, and the at least one third electrode, i.e., the non-faradaic cathode or the cathodic non-faradaic energy storage material;
    a separator situated between adjacent electrodes; and
    a liquid electrolyte between adjacent electrodes.

In embodiments, the disclosure provides an integrated energy and power article, device, or system, comprising:
  a housing containing:
    at least three electrodes comprising:
      at least one first electrode comprising a cathodic faradaic energy storage material;
      at least one second electrode comprising an anodic faradaic energy storage material; and
      at least one third electrode comprising a cathodic non-faradaic energy storage material, wherein the at least one first electrode is adjacent to the at least one second electrode, and the at least one third electrode is adjacent to the at least one second electrode;
    a separator between the electrodes; and
    a liquid electrolyte between the electrodes.

In embodiments, the cathodic faradaic energy storage material in the first electrode comprises a lithium transition metal complex, the anodic faradaic energy storage material in the second electrode comprises a carbon having a low surface area of from 1 to 500 $m^2/g$, and the cathodic non-faradaic energy storage material in the third electrode comprises a carbon having a high surface area of from 800 to 3000 $m^2/g$.

In embodiments:
  the cathodic faradaic energy storage material can be, for example, a lithium containing compound selected from the group of: $LiCoO_2$ (lithium cobalt oxide), $LiMn_{1.5}Ni_{0.5}O_4$ (lithium manganese nickel oxide), $LiMn_2O_4$ (lithium manganese oxide), $LiFePO_4$ (lithium iron phosphate), $LiNiMnCoO_2$ (lithium nickel manganese cobalt oxide), $LiNiCoAlO_2$ (lithium nickel cobalt aluminum oxide), or a mixture thereof;
  the anodic faradaic energy storage material can be selected, for example, from the group of: silicon nanoparticles; porous silicon, tin nanoparticles; graphene; vanadium oxide sourced compounds; carbon nanotubes; titanium oxide sourced compounds; germanium; antimony; graphite or hard carbon; or a mixture of thereof; and
  the cathodic non-faradaic energy storage material can be selected, for example, from the group of: activated carbon having a surface area of from 800 to 3000 $m^2/gm$ where activated carbon is from 45 to 100 wt % of the total active material in the non-faradaic cathode; a mixture or combination of activated carbon and graphite; a mixture or combination of activated carbon and a hard carbon; or mixtures thereof. An example is a carbon mixture including 50 wt % of activated carbon and 50 wt % of hard carbon. The mixture is physically mixed together, and the mixture is coated on the same side of the current collector.

In embodiments, the faradaic cathode energy storage material, the non-faradaic cathode energy storage material, and the faradaic anode energy storage material comprise components that have a relative spatial relation represented by at least one of the formulas (I), (II), or (III):

$$C/S\backslash A\backslash S/C/S\backslash A\backslash S/C/S\backslash A\backslash S/C/S\backslash A\backslash S/CSC'/S\backslash A\backslash S/C' \qquad (I);$$

$$C/S\backslash A\backslash S/C/S\backslash A\backslash S/CSC'/S\backslash A\backslash S/C' \qquad (II);$$

$$C/S\backslash A\backslash S/C/S\backslash A\backslash S/C/S\backslash A\backslash S/C/S\backslash A\backslash S/C/S\backslash A\backslash S/CSC'/S\backslash A\backslash S/C' \qquad (III),$$

where "C" is a faradaic cathode, "C'" is a non-faradaic cathode, "/" is a single-side coat, "/C/" is a cathode coated on both sides, and "\A\" is a faradaic anode coated on both sides.

In embodiments, the at least three electrodes can comprise, for example, a plurality of faradaic cathode energy storage material electrodes, such as from 2 to 1,000 electrodes, and a plurality of non-faradaic cathode energy storage material electrodes, such as from 2 to 200 electrodes, where the ratio of the number of faradaic cathode electrodes to the number of non-faradaic cathode electrodes is from 0.01 to 50.

In embodiments, the device can further comprise, for example, an external connector for each electrode, or an external connector for each group of two or more identical electrodes.

In embodiments, the device can further comprise, for example, an external switch connected to each external connector for each electrode.

In embodiments, the faradaic anode energy storage material can be coated, for example, on both sides of a copper foil current collector, and the faradaic cathode energy storage material and the non-faradaic cathode energy storage material can be each separately coated, for example, on opposite sides of an aluminum foil current collector.

In embodiments, the electrolyte composition can comprise, for example, at least one of: a $LiPF_6$ in a non-aqueous solvent; an onium salt and a non-aqueous solvent; or a combination thereof.

In embodiments, the electrolyte composition can comprise, for example, a quaternary ammonium cation and a tetrafluoroborate anion, a halide ion, or a combination of ions, and a non-aqueous solvent can be selected from at least one of: a nitrile, an ester, a sulfone, an ether, or a mixture thereof.

In embodiments, the electrolyte can be a single electrolyte or a mixture of two or more electrolytes.

In embodiments, the electrolyte can be dispensed, such as pipetted, into a pouch, which contains the electrode stack, so that the electrolyte is between adjacent electrodes, and additionally or optionally around the entire electrode stack.

In embodiments, the at least three electrodes can comprise, for example:

the at least one first electrode includes a lithium containing compound;

the at least one second electrode includes at least one of a hard carbon, a graphite, or a mixture thereof; and the at least one third electrode includes an activated carbon having a high porosity of from 0.2 to 1.5 $cm^3/gm$ and a high surface area of from 800 to 3000 $m^2/g$, wherein the at least one first electrode is adjacent to the at least one second electrode, and the at least one second electrode is adjacent to the third electrode.

In embodiments, the device has an energy density is from 20 to 500 Wh/l (e.g., 350 Wh/l in FIG. 3), and is comparable to the energy density of a lithium ion battery, and the device has power from 200 to 20,000 W/l (e.g., 3000 W/l in FIG. 2), and is significantly greater than an EDLC capacitor. Energy densities for Li ion batteries of the prior art are, for example, 175 to 350 Wh/l. EDLC devices of the prior art, having comparable size as the disclosed experimental device, have power levels of from 1000 to 2500 W/l (e.g., a 100F device). A full or larger size EDLC device (e.g., a 3000F device) can have power levels of from 7,000 to 9,000 W/l. The disclosed experimental devices, like the EDLC devices, are believed to have proportionate and scalable power levels.

In embodiments, the disclosure provides integrated energy and power components in a lithium ion energy and power system, comprising a housing containing at least three electrodes comprising:

at least one first electrode, i.e., first cathode, comprising a lithium transition metal compound;

at least one second electrode, i.e., first anode, comprising an un-activated carbon; and at least one third electrode (i.e., second cathode) comprising an activated carbon, wherein the at least one first electrode is adjacent to the at least one second electrode, and the at least one third electrode is adjacent to the at least one second electrode, and the un-activated carbon is electrically isolated from the electrically coupled lithium transition metal compound of the at least one first electrode and the activated carbon of the at least one third electrode cathode;

a separator situated between adjacent electrodes; and a single electrolyte composition between adjacent electrodes.

In embodiments, the lithium transition metal compound in the at least one first electrode can comprise, for example, a lithium transition metal salt complex, the non-activated carbon in the at least one second electrode can comprise, for example, a carbon having a low surface area of from 1 to 500 $m^2/g$, and the activated carbon in the at least one third electrode can comprise, for example, a carbon having a high surface area of from 800 to 3,000 $m^2/g$.

In embodiments, the single electrolyte comprises a salt selected from a quaternary ammonium tetrafluoroborate compound or a $LiPF_6$ compound, and a non-aqueous solvent selected from at least one of: a nitrile, an alkyl ester, a sulfone, an ether, a dialkyl carbonate, a dialkylene carbonate, a fluorinated dialkylene carbonate, or a mixture thereof.

In embodiments, the integrated energy and power device can comprise, for example: at least three electrodes arranged in a power electrode combination and an energy electrode combination, wherein the power electrode combination operates at from 2.2 to 3.8 V, and the energy electrode combination operates at from 3.0 to 4.2 V.

In embodiments: the power electrode combination comprises at least one electrode containing an activated carbon paired with at least one electrode containing a first graphite or a first hard carbon; and the energy electrode combination comprises at least one electrode containing an activated carbon, a first graphite, or a first hard carbon, paired at least one electrode having a lithium compound.

In embodiments, the power electrode combination can comprise, for example: the first graphite or the first hard carbon containing electrode has a surface area of from 10 to 300 $m^2/gm$, including intermediate values and ranges, and the activated carbon containing electrode has a surface area of from 500 to 2,000 $m^2/gm$, including intermediate values and ranges; and the energy electrode combination can comprise, for example: the electrode containing activated carbon has a surface area of 500 to 2,000 $m^2/gm$, and the electrode containing the first graphite or the first hard carbon has a surface area of from 10 to 300 $m^2/gm$, and the electrode containing a lithium compound includes a $LiCoO_2$ compound or like compound.

In embodiments, the disclosure provides an integrated energy and power device comprising:

a housing containing: at least three electrodes, wherein each electrode has a dissimilar energy storage, dissimilar energy discharge characteristic, or dissimilar structure;

a separator situated between adjacent electrodes; and an electrolyte composition between adjacent electrodes.

In embodiments, the device can have three electrodes having, for example, two of the electrodes having a faradaic energy storage characteristic, and one electrode having either a double layer or a non-faradaic energy storage characteristic.

In embodiments, the disclosure provides a method of making the disclosed integrated energy and power device as defined and illustrated herein, such as in the working examples.

In embodiments, the disclosure provides a method of using the disclosed integrated energy and power device as defined and illustrated herein, such as in the working examples.

In embodiments, the disclosure provides a method of using the disclosed IEPD device or system, comprising:

charging, discharging, or charging and discharging the system as a battery;

charging, discharging, or charging and discharging the system as a capacitor;

or a combination thereof, for example, simultaneously or sequentially.

In embodiments, the disclosed IEPD or EPD device, article, or system, and method of using can further comprise, for example, using the system in combination with another system having a need for storage, supply, or both, of energy, power, or both, for example, at least one of: a vehicle, a consumer electronic device, an electronic appliance, a wind turbine, a wave-action turbine, a component of an electrical or power grid system, or a combination thereof. A vehicle can be, for example, a mobile machine that transports, for example, people, cargo, or a purposeful payload, such as camera or an military ordinance in a drone or unmanned aerial system (UAS). Other examples of vehicles are wagons, bicycles, motor vehicles (e.g., motorcycles, cars, trucks, buses, trains), watercraft (e.g., ships, boats), spacecraft, aircraft, or combinations thereof.

The present disclosure is advantaged is several aspects, including, for example, providing an integrated energy and power device or system that:

can be tailored to specific applications;

eliminates the need for two separated devices;

substantially reduces total device size, weight, and manufacturing costs;

substantially reduces the total device space and connector requirements;

facilitates integration into various systems and applications; and has a form factor that permits widespread integration and use of the device.

The disclosure provides an energy storage device or system referred to as an Integrated Energy and Power Device (IEPD) that permits high energy and high power output for a given application in a single package as opposed to separate devices of the prior art for power and energy. Many applications, e.g., military and commercial, call for increased energy and power densities. Battery-capacitor combinations are known. However, the battery and the capacitor are two separate circuit components or units, and are not a single device package (see S. Y. Kan, et al., Battery-Capacitor combinations in photovoltaic powered products; *Journal of Power Sources,* 162 (2006) 971-974). An on-going interest is to develop an energy storage device that combines the energy capability of a Li-ion battery and power capability of a ultracapacitor. One potential system which has been reported (see *Journal of Power Sources,* 162 (2006) 971-974) is a hybrid system which features a battery and an ultracapacitor (EDLC) and uniquely designed electronics to control energy flow between the separate components. The main advantage of this solution is the ability to optimize each component for energy or power. Battery-capacitor combinations are mainly used in high current pulse applications. In these combinations the advantage of high power density or the ability to deliver large discharge rates by the capacitor is combined with the high energy density of the battery. Such prior art combination requires two separate devices working at different potentials leading to issues such as high cost and system integration difficulties.

U.S. Pat. No. 5,439,756 ('756) mentions a device having three different electrodes where the center electrode is a nickel electrode, which acts like a faradaic cathode, and is adjacent to a cadmium electrode, which acts as a faradaic anode. The nickel and cadmium form a nickel-cadmium electrode combination for energy storage. The same nickel electrode is shared with another activated carbon electrode for power storage. The nickel electrode acts as a faradaic cathode and the activated carbon as the non-faradaic anode and is coupled together for power storage. The '756 patent also mentions the use of one faradaic cathode with a faradaic anode and a non-faradaic anode, resulting in a device containing one cathode and two anodes. This configuration is significantly different from the presently disclosed IEPD. The presently disclosed IEPD comprises at least one faradaic anode, at least one faradaic cathode, and at least one non-faradaic cathode, resulting in a device containing at least two cathodes and at least one anode.

In '756, all the electrodes operate between the same voltage window of 0.8 to 1.7V. The similar voltage window for all electrodes allows sharing of the cathode between the two anodes. In contrast, the presently disclosed IEPD operates at two significantly different voltages for the respective energy storage component or function and power storage component or function. The energy storage component or function can operate, at for example, from about 3.0 to 4.2V, including intermediate values and ranges, and the power storage component or function operates from about 2.2 to 3.8V, including intermediate values and ranges. Accordingly, the same faradaic anode cannot be shared by (i.e., must be electrically isolated from) a faradaic cathode and a non-faradaic cathode.

In a lithium ion battery (LIB), the anode can comprise a lithium intercalating carbon such as graphite, mesocarbon microbeads (MCMB), a hard carbon or soft carbon, or other forms of carbon such as graphene, carbon nanotubes, other materials such as silicon nanoparticles, tin nanoparticles, and other materials known in the art for silicon intercalation such as intermetallics or mixtures of any of the materials mentioned such composites of graphene, silicon nanoparticles, vanadium oxide based compounds, carbon nanotubes, titanium oxide based compounds, germanium, antimony, and like materials. The cathode can comprise materials made from lithium complexed with transition metals. Some exemplary cathode material examples used in the lithium ion battery industry are, for example, $LiCoO_2$, $LiMn_{1.5}Ni_{0.5}O_4$, $LiMn_2O_4$, $LiFePO_4$, and like materials. Such materials may be useful in the disclosed IEPD or EPD.

In a lithium ion battery during the charge process, lithium ions are de-intercalated from the bulk of the cathode and transferred to the anode via an ionic conduction mechanism through the electrolyte and intercalated into the bulk of the anode (i.e., negative electrode). During the charge process, the electrons flow from the cathode to the anode. During the discharge process, the entire charge process is reversed. The electrons are transferred from the anode to the cathode. The lithium ions are de-intercalated from the bulk of the anode and transferred to the cathode via an ionic conduction mechanism through the electrolyte. The transferred lithium ions are then intercalated into the bulk of the cathode electrode. In a lithium ion battery, energy is stored due to faradaic reaction(s) on the anode and the cathode. The state of charge of the electrolyte is always neutral and constant, which means there is no significant change in the concentration of electrolyte. The lithium ions responsible for the energy storage in a lithium ion battery depend on the number of lithium ions available in the cathode. In a lithium ion battery, because of the faradaic reactions involved, large discharge currents generate heat due to high internal resistance, which can lead to battery destabilization and failure.

Delivering large current surges is thus not possible in a lithium ion battery. So although the batteries have high energy density, the power delivered by the batteries is low. In many applications high power, i.e., large current surges are needed, for example, for starting an automobile. In such instances, either the battery has to be made disproportionately large since only a small fraction of the energy can be extracted or a double layer capacitor has to be used in combination with the battery. In many applications such a physical combination of a ganged battery and a capacitor component is used.

In contrast, capacitors are suitable for delivering large current pulses. Ultracapacitors such as an electrochemical double layer capacitor (EDLC) or a lithium ion capacitor (LICs) can be used to provide large current pulses. An EDLC consists of a positive and a negative electrode made from, for example, a high surface area carbon laminated on a metallic foil such as aluminum, which foil acts as a current collector, and the electrodes are non-faradaic in nature. Conventionally, a carbon electrode consists of a mixture of activated carbon, a conductive carbon such as carbon black, and a polymeric binder such as PVDF or PTFE, which binder adheres the components of a carbon electrode to the current collector. The two electrodes are separated by, for example, a porous cellulosic separator. The porous cellulosic separator is electronically insulating but ionically conducting, which allows the ions from the electrolyte to migrate to the electrodes and back into the electrolyte solution. Conventional electrolytes used in an EDLC are, for example, a quaternary ammonium ($R_4N^+$) ion as the cation and a tetrafluoroborate ($BF_4^-$) ion as anion.

Lithium ion capacitors (LICs) function as a hybrid between an EDLC and a lithium ion battery. EDLCs store energy based on a double layer mechanism on both electrodes. In contrast, a hybrid lithium ion capacitor stores energy on the cathode through a double layer mechanism (like an EDLC), but energy storage on the anode is via a faradaic mechanism (as in a lithium ion battery).

LICs can use a high surface area activated carbon, typically greater than 500 $m^2/g$, on the cathode (positive electrode), and an intercalating hard carbon on the anode (hard carbon is typically derived from a synthetic or natural source via charring the carbon in an inert atmosphere). This carbon is not oxidized. Generally, an activated carbon has a low surface area such as less than 300 $m^2/gm$. However, hard carbon can also be created via templating procedures known in the literature where the carbon source is deposited on a template, for example, a silica template material, and charred in an inert atmosphere. The templating procedure can provide hard carbons having a high surface area, for example, of from 300 to 500 $m^2/gm$, a mesoporosity (i.e., in the pore size range of from 2 to 500 nanometers), and microporosity (i.e., in the pore size range of from 0.1 to 2 nanometers). This porosity is not created in the oxidation process for an activated carbon having a low porosity and lower surface area, typically less than 300 $m^2/g$, on the anode, which disposition supports a fast intercalation and de-intercalation of lithium ions. During charge and discharge, lithium intercalation and de-intercalation occurs within the bulk of the anode (i.e., the negative electrode), whereas anion adsorption and desorption takes place on the cathode electrode. The adsorption and desorption on the cathode (i.e., the positive electrode) is a non-faradaic reaction which is relatively faster than the lithium ion intercalation and de-intercalation on the anode.

It has been found that for either an EDLC or a LIC can provide a large current pulse and either can be used for a power delivery application. In the LIC the negative electrode (intercalating and de-intercalating) can be pre-doped with a lithium metal. The pre-doping of the lithium ion capacitor can result in an increase in the voltage to about 3.8 volts. Due to the completely non-faradaic or semi-non faradaic nature of the EDLC and the LIC, respectively, the EDLC or LIC can be charged and discharged much faster than a lithium ion battery and is capable of giving a large current pulse.

This feature of delivering a large current pulse in a capacitor can be used for product applications such as initializations of electric motors. By pairing a capacitor with battery, the battery is prevented from deep discharge cycles and the current can be drawn from a capacitor. Such battery-capacitor combinations result in better reliability and longer battery life. However, this advantage comes at the expense of increased weight, increased volume, increased packaging of the storage system, and the increased costs associated with fabricating of two different devices.

A high-reliability double layer capacitor ("Capattery®") having a battery-capacitor like property combination contained in a single package is commercially available from Evans Capacitor Co. (see evanscap.com/the_capattery.htm)

To circumvent the issues mentioned above, the present disclosure provides an Integrated Energy Power Device (IEPD), which is characterized as a single device package that contains at least three different electrodes with each different electrode having a distinct material composition. The disclosed configurations are different from a standard electrochemical device, which has only two materially distinct electrodes. In the disclosed configuration all of the at least three distinct electrodes are working electrodes. In embodiments, at least one of the electrodes stores energy by a double layer mechanism (i.e., a non-faradaic mechanism) whereas at least two of the other electrodes store energy by a faradaic mechanism. All three types electrodes in the package can share the same electrolyte. For a given application, the ratio of the different storage mechanism types of electrodes and their number can be adjusted to give a desired energy and desired power in the same device. Examples of different ratios of the different storage mechanism types of electrodes are described in Examples 1, 2, and 3.

The disclosed IEPDs can be very attractive from the perspective of applications since the cost of a single device that address energy and power needs is significantly lower compared to two separate devices, which separate devices have to be manufactured and accommodated in the same instrumentality. From a performance perspective, the IEPD device is very attractive since all the inefficiencies related to loss in power and energy due to substantial volume of inactive materials essential for packaging in essentially reduced by half.

In embodiments, the disclosure provides a rechargeable device that integrates both power and energy capabilities of a battery and a capacitor, and is referred to as an integrated energy and power device (IEPD).

In embodiments, the disclosed device can include at least three different types of working electrodes.

In embodiments, although not limited by theory, the at least three different types of electrodes can each have a different energy storage mechanism.

In embodiments, although not limited by theory, two of the at least three of electrodes can have a faradaic mechanism and a third electrode can have a double layer mechanism.

In embodiments, all of the electrodes can share the same electrolyte.

In embodiments, one electrode can contain an activated carbon having a high porosity, for example, from 0.2 to 1.5 cm$^3$/gm, including intermediate values and ranges, and a high surface area, such as greater than 800 m$^2$/gm up to 3000 m$^2$/g, including intermediate values and ranges, where the activated carbon is, for example, of from 51 to 100 wt % of the total active material in the electrode. In some instances combinations of activated carbon with graphite or other hard carbons can be useful. The other two electrodes can have a faradaic energy storage mechanism but their material compositions are purposefully different. For example, one of the two faradaic electrodes can be a lithium inorganic composition, and the other faradaic electrode can be a graphite or hard carbon composition electrode. In this example, the electrode containing a lithium inorganic composition or compound is a faradaic cathode and the activated carbon electrode is a non-faradaic cathode. The hard carbon or graphite electrode can be the faradaic anode.

In embodiments, various lithium compounds are known that can be used for faradaic cathode. The lithium compounds that can be selected for the faradaic cathodes can contain, for example, a lithium metal transition metal complex such as lithium cobalt oxide, lithium manganese oxide, lithium manganese nickel oxide, lithium iron phosphate, lithium nickel manganese cobalt oxide, lithium nickel cobalt aluminum oxide, or like compounds, and mixtures thereof.

In embodiments, the faradaic anode electrode can comprise, for example, silicon nanoparticles, tin nanoparticles, graphene, a vanadium oxide based compound, carbon nanotubes, a titanium oxide sourced compound, germanium, antimony, a graphite, a hard carbon, or a composite mixture of these and like materials.

In embodiments, the disclosure provides an IEPD that can provide, in the same device, an energy density that is similar to that of a lithium ion battery, and a power production that is similar to or substantially greater than that of a lithium ion capacitor.

The working electrodes can include, for example, one activated carbon electrode, one hard carbon or graphite electrode, and one electrode can contain a lithium metal transition metal complex such as LiCoO$_2$. The graphite or hard carbon electrode can functions as an anode, and the other two electrodes can functions as cathodes. Each of the adjacent electrodes are separated by a separator such as a cellulose or polymer sourced separator. The electrolyte can be, for example, a carbonate based electrolyte. However, the electrolyte is not limited to carbonates, and can involve different solvents and salt combinations, such as a nitrile, an ester, a sulfone, an ether, and like compounds, or mixtures thereof, as electrolyte solvents, and salts containing, for example, lithium, potassium, sodium, cesium, ammonium, and like cations, or mixtures thereof, in the electrolyte salt. Examples of lithium salt are LiPF$_6$, LiBF$_4$, LiSbF$_6$, LiAsF$_5$, LiClO$_4$, CF$_3$SO$_3$, or mixtures thereof. A preferred electrolyte is from 1 to 1.5 M LiPF$_6$ in a 20:20:60 by volume mixture of ethylene carbonate:dimethyl carbonate:methyl propionate, and 5 wt % by superaddition of fluoroethylene carbonate.

Referring to the figures, FIG. 1 is a graph showing energy density of the three inventive IEPD devices of Examples 1, 2, and 3, during cyclic conditioning.

Figure 2:
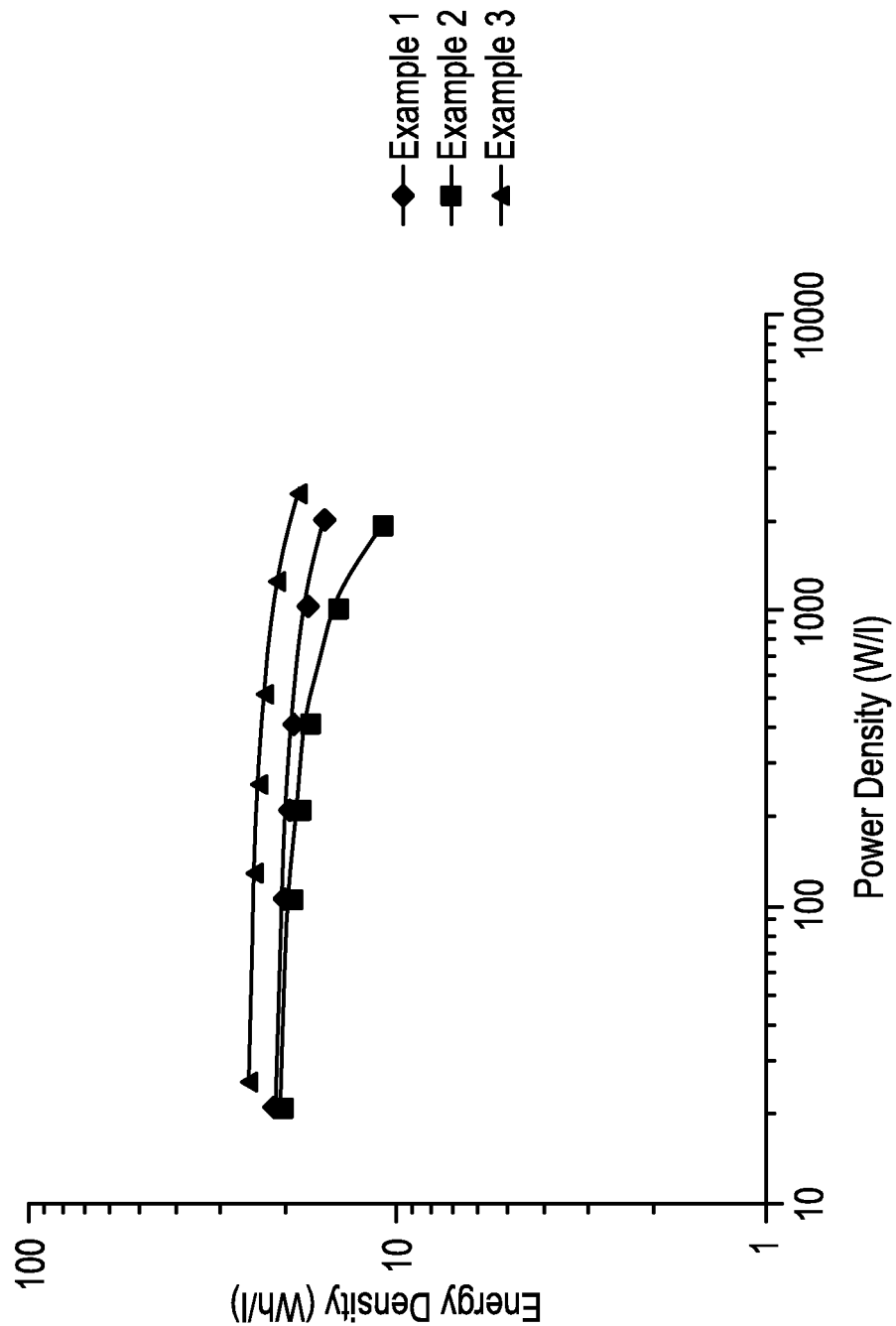
FIG. 2 is a graph showing the rate performance of each of the IEPDs of Examples 1, 2, and 3.

FIG. 2 is a graph showing the rate performance of each of the IEPDs of Examples 1, 2, and 3. FIG. 2 is a volumetric Ragone plot that shows the rate performance of the IEPDs of Examples 1, 2, and 3. The plot shows that the energy density of each of the devices is very high and in the range of a lithium ion battery, and the power is also very high, and significantly higher than an EDLC capacitor.

Figure 3:
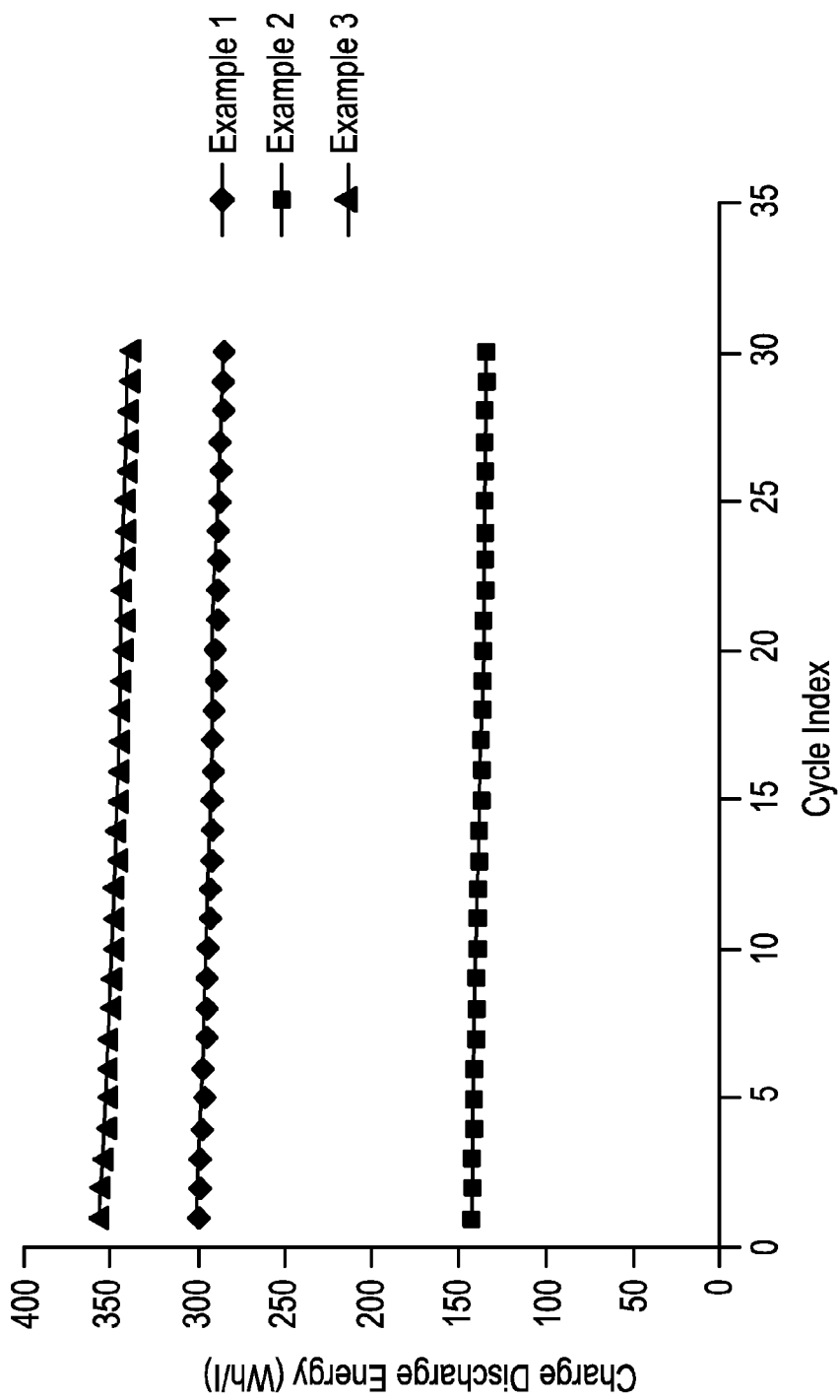
FIG. 3 is a graph showing the cycling performance of each of the IEPDs of Examples 1, 2, and 3.

FIG. 3 is a graph showing the cycling performance of each of the IEPDs of Examples 1, 2, and 3. FIG. 3 shows a cycling data comparison for the IEPDs of Examples 1, 2, and 3, cycled at 1 C rate, i.e., charging in 1 hr and discharging in 1 hr, as a battery.

Different types of electrodes are shown in FIGS. 4, 5, 6, 7, and 8, and are detailed below.

In embodiments, the IEPD can be extended to, for example, a cylindrical, a prismatic, a pouch, or like casings. The electrodes in the IEPD can have, for example, a wound (aka.: "jelly roll") or a stacked configuration. The total area of the electrodes for power to the total area of electrode for energy can be controlled by various possible configurations depending on the requirement for power and for energy. For example, the non-faradaic cathode shown in FIG. 8 can be coupled with the faradaic anode shown in FIG. 5, separated by a separator, and the faradaic cathode shown in FIG. 7 can be coupled with the faradaic anode shown in FIG. 6 separated by a separator. The ratio of the area of the faradaic anode:non-faradaic cathode, and the ratio of the area of the faradaic anode:faradaic cathode can be controlled depending on the energy and power requirement of the IEPD device.

Figure 4:
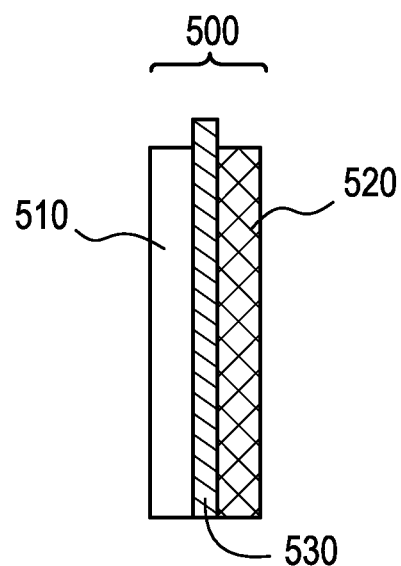
FIG. 4 is a schematic in cross-section of a faradaic anode electrode composition (500) including a hard carbon (510), and a graphite (520), respectively, coated on opposite sides of copper foil (530).
Figure 5:
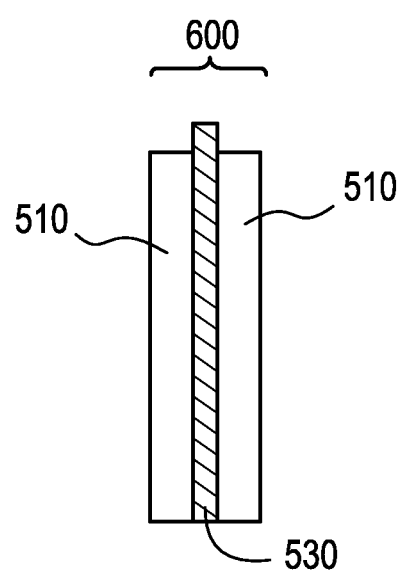
FIG. 5 is a schematic in cross-section of another faradaic anode electrode composition (600) including hard carbon (510) coated on both sides of copper foil (530).
Figure 6:
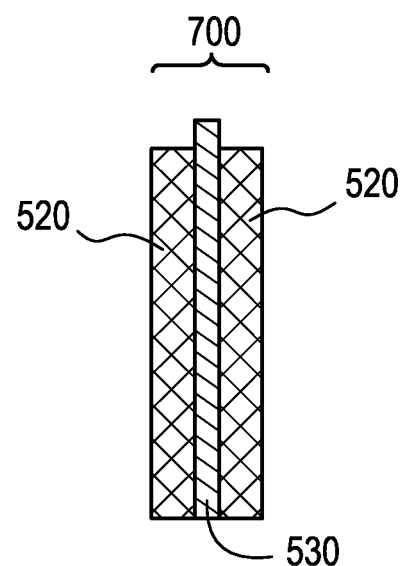
FIG. 6 is a schematic in cross-section of another faradaic anode electrode composition (700) including a graphite (520) coated on both sides of copper foil (530).

The electrodes shown in FIGS. 4, 5, and 6 can be used as anodes in an IEPD.

FIG. 4 shows a faradaic anode electrode having as faradaic materials a hard carbon material on one side and a graphite material on the opposite side of a copper foil current collector. FIG. 4 is a schematic in cross-section of a faradaic anode electrode composition (500) including a hard carbon (510), and a graphite (520), respectively, coated on opposite sides of copper foil (530).

FIG. 5 shows a faradaic anode electrode having a hard carbon material on both sides of a copper foil current collector. FIG. 5 is a schematic in cross-section of the faradaic anode electrode composition (600) including hard carbon (510) coated on both sides of copper foil (530).

Figure 7:
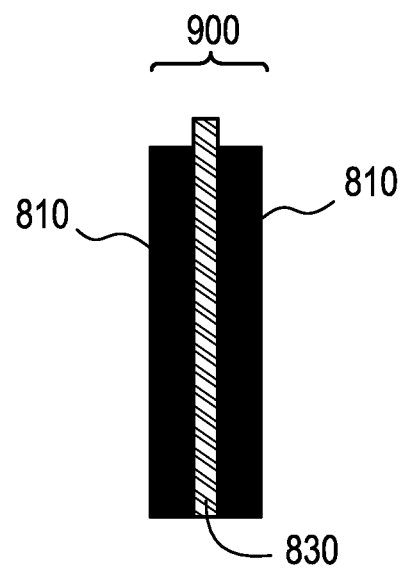
FIG. 7 is a schematic in cross-section of a faradaic cathode electrode (900) having a faradaic cathode composition, such as a lithium transition metal complex (810), coated on both sides of an aluminum foil (830).

FIG. 6 shows a faradaic anode electrode having graphite material on both the sides of a copper foil current collector electrode. FIG. 7 is a schematic in cross-section of the faradaic anode electrode composition (700) including a graphite (520) coated on both sides of copper foil (530).

FIG. 7 shows a faradaic cathode electrode having a lithium transition metal complex material on both the sides of an aluminum foil current collector. The lithium transition metal complex on both the sides of the aluminum foil current collector can be, for example, the same material, two different lithium transition metal complex materials, or a mixture of two different lithium transition metal complex materials on both sides. FIG. 7 is a schematic in cross-section of a faradaic cathode electrode (900) having a faradaic cathode composition, such as a lithium transition metal complex (810), coated on both sides of an aluminum foil (830).

Figure 8:
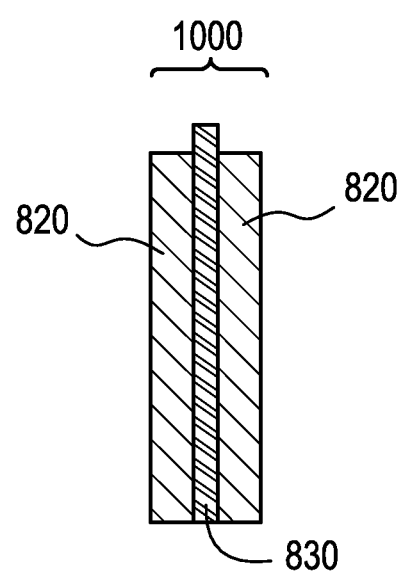
FIG. 8 is a schematic in cross-section of a non-faradaic cathode electrode (1000) having a non-faradaic material composition, for example, an activated carbon (820) coated on both sides of aluminum foil (830).

FIG. 8 shows a non-faradaic cathode electrode having an activated carbon on both sides of an aluminum foil current collector. The electrodes represented in FIGS. 7 and 8, can be selected as the cathodes in exemplary IEPDs. FIG. 8 is a schematic in cross-section of the non-faradaic cathode electrode (1000) having a non-faradaic material composition, for example, an activated carbon (820) coated on both sides of aluminum foil (830).

In embodiments, the electrodes can be referred to as a power electrode combination or power electrode pair, or an energy electrode combination or energy electrode pair. One power electrode combination or pair can be, for example, an activated carbon electrode, and a graphite electrode or hard carbon electrode. One energy electrode combination or pair can be, for example, a graphite electrode or hard carbon, and a $LiCoO_2$ electrode.

Figure 9:
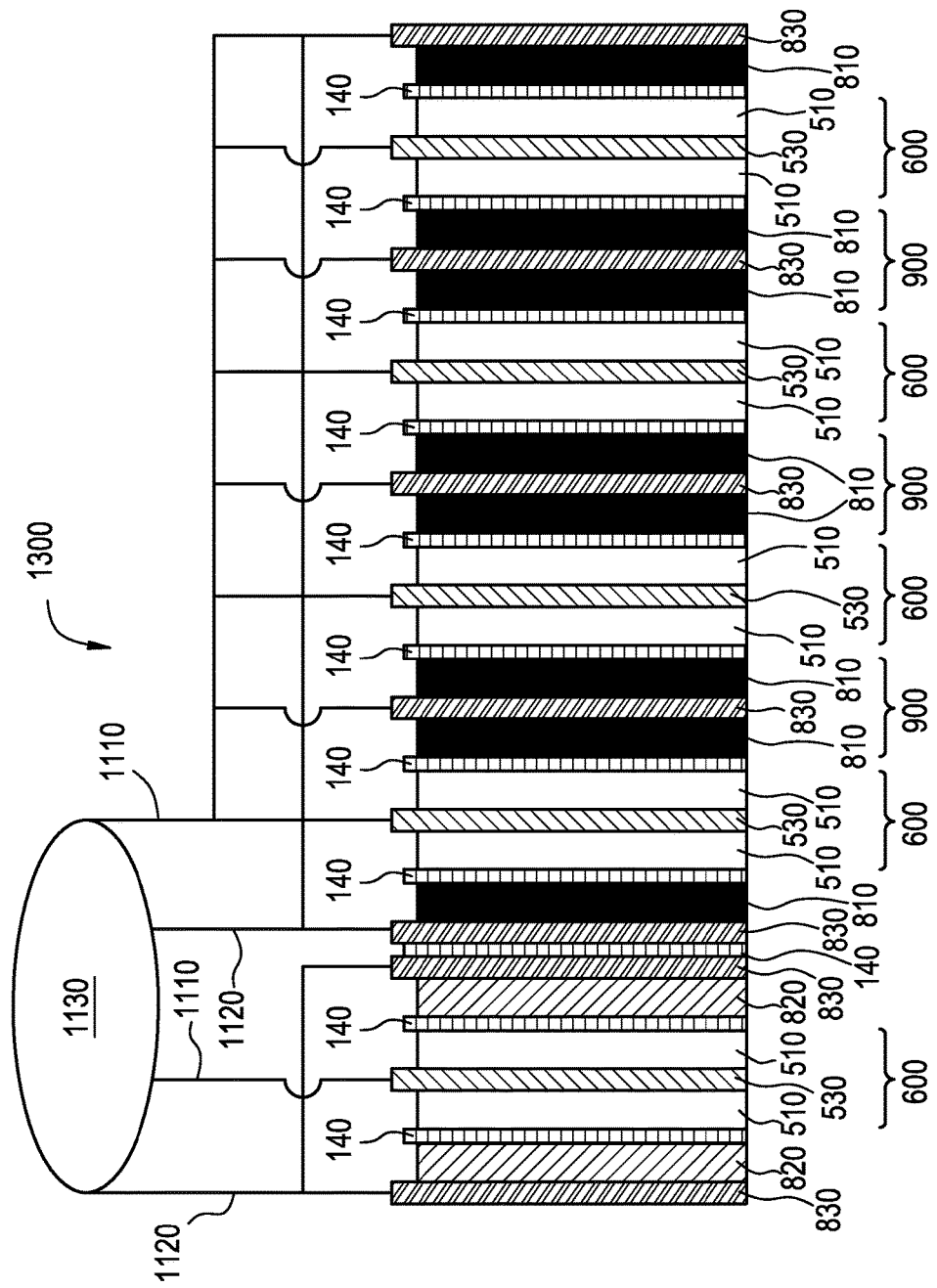
FIG. 9 shows an exemplary IEPD configuration (1300) of Example 1.
Figure 10:
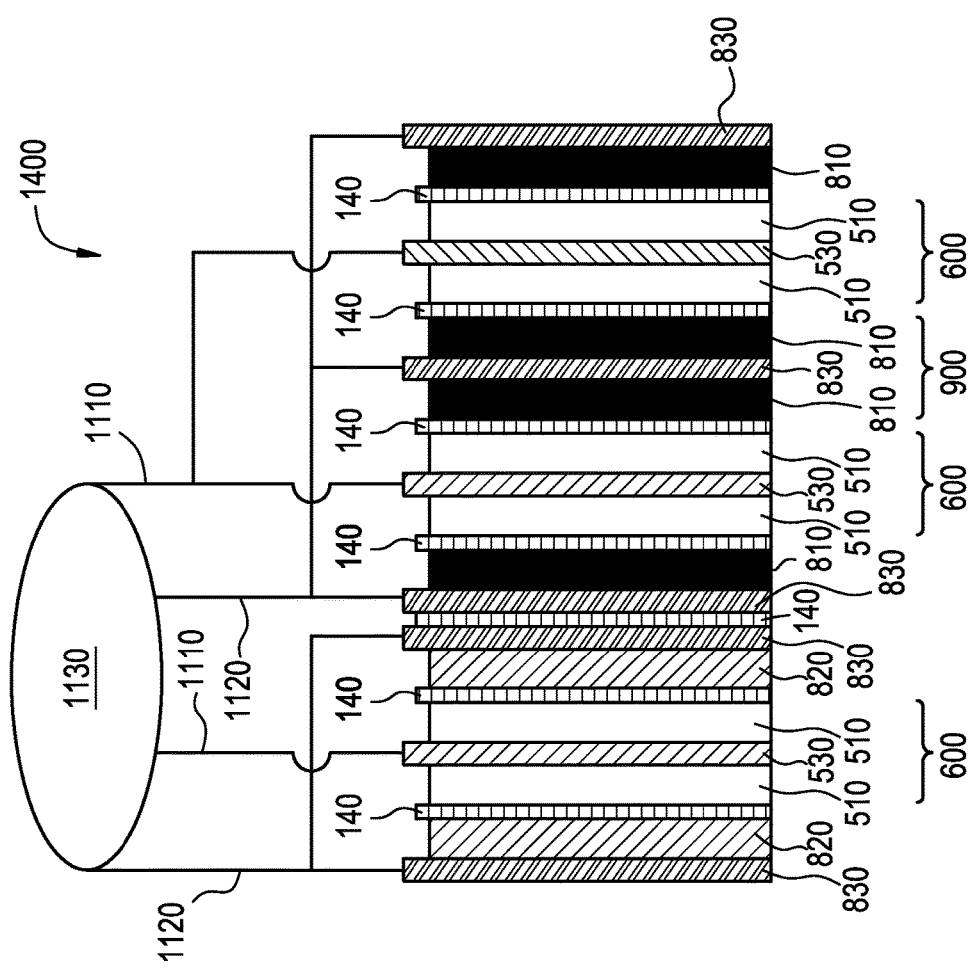
FIG. 10 shows an exemplary IEPD configuration (1400) of Example 2.
Figure 11:
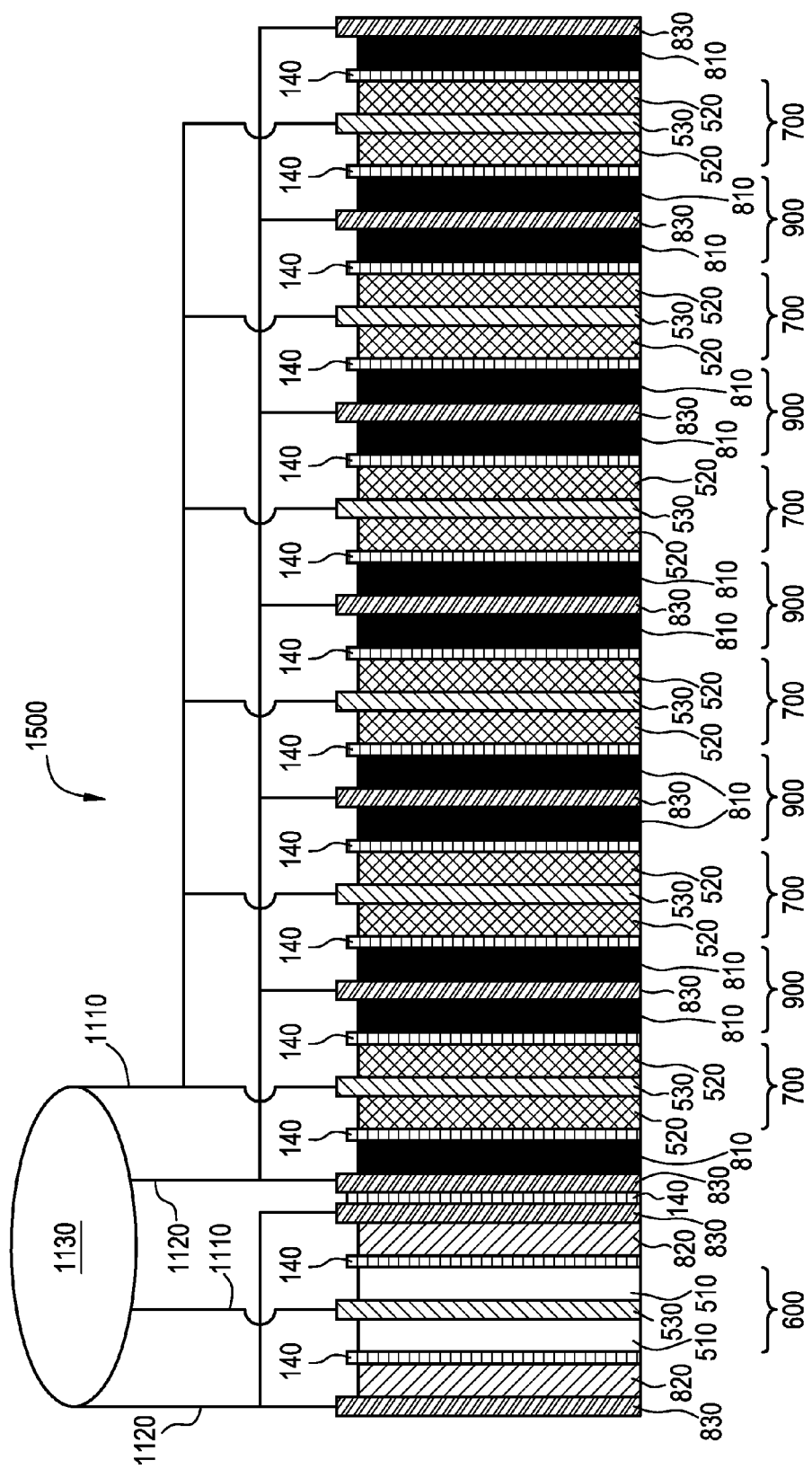
FIG. 11 shows an exemplary IEPD configuration (1500) of Example 3.

The power and energy combination can then be arranged together. The number of each type of electrode combination can be determined by the amount of energy and power desired for a given application. For example, all the power combinations can be arranged together and all the energy combinations can be arranged together as desired. For example, different arrangements of the IEPD are shown in FIGS. 9, 10, and 11. The electrodes are electrically separated with a separator but can still be ionically conducting through the separator. For example in FIG. 9, the IEPD involves three different types working electrodes. Two of the electrodes can be characterized as a faradaic type, and one of the electrodes can be characterized as a non-faradaic type. The electrodes made of graphite or hard carbon can serve as the faradaic anode electrode. The electrodes made from activated carbon can serve as the non-faradaic cathode. The electrodes made from a lithium transition metal complex serve as the faradaic cathode. Generally, the faradaic anodes can be coated on, for example, copper, whereas the faradaic and non-faradaic cathode materials can be coated on, for example, aluminum. The number of electrode pairs can be adjusted depending energy and power requirements of the device. An electrode pair can be, for example, a first pair comprising a faradaic anode comprising a graphite or a hard carbon material paired with a faradaic cathode comprising a Li metal transition complex; and a second pair comprising a faradaic anode such as a graphite or a hard carbon paired with a non-faradaic cathode graphite, for example, an activated carbon. However, the same faradaic anode cannot be shared by a faradaic cathode and a non-faradaic cathode.

All electrodes having the same composition can be connected to the same external lead or connector. There are three principle leads coming out of the IEPD or EPD device. An optional switch can be connected to all the three leads and depending on the external system's need or requirement for power and energy. The switch can be used to provide optimum or preferred lead combinations in the electrode configurations.

FIG. 9 shows an exemplary IEPD configuration (1300) used in Example 1. Example 1 has five double-sided, coated faradaic anodes (510/530/510)(i.e., electrodes 600) based on hard carbon (510) on copper foil (530). Example 1 has three double-sided coated (i.e., coated on both sides) faradaic cathodes (810/830/810) (i.e., electrodes 900) based on a lithium transition metal complex (810) (i.e., lithium cobalt oxide) on aluminum foil (830), and two single-sided, coated (i.e., coated on one side) faradaic cathodes (830/810 and 810/830) based on lithium transition metal complex (810) (i.e., lithium cobalt oxide) on aluminum foil (830). Example 1 has two single-side coated non-faradaic cathodes (830/820 and 820/830) based on activated carbon (820) on aluminum foil (830).

The IEPD configuration (1400) in FIG. 10 has three double-side coated faradaic anodes based on hard carbon (510) on copper foil (530) (i.e., electrodes 600), one double-side coated faradaic cathode (810/830/810) (i.e., electrode 900) based on a lithium transition metal complex (810) (i.e., lithium cobalt oxide), and two single-side coated faradaic cathodes (830/810 and 810/830) based on lithium transition metal complex (810) (i.e., lithium cobalt oxide) on aluminum foil (830). Example 2 has two single-side coated non-faradaic cathodes (830/820 and 820/830) based on activated carbon (820) on aluminum foil (830).

The IEPD (1500) of FIG. 11 and used in Example 3 had one double-side coated faradaic anode (510/530/510) (i.e., electrode 600) based on hard carbon (510) on copper foil (530), and six double-side coated faradaic anodes (520/530/520) (i.e., electrodes 700) based on graphite (520) on copper foil (530). Example 3 had five double side coated faradaic cathodes (810/830/810) (i.e., electrodes 900) based on a lithium transition metal complex (810) (i.e., lithium cobalt oxide) on copper foil (830), and two single-side coated faradaic cathodes (830/810 and 810/830) based on a lithium transition metal complex (810) (i.e., lithium cobalt oxide) on aluminum foil (830). Example 3 has two single-side coated non-faradaic cathodes (830/820 and 820/830) based on activated carbon (820) on aluminum foil (830) which bracket electrode 600.

Figure 12A:
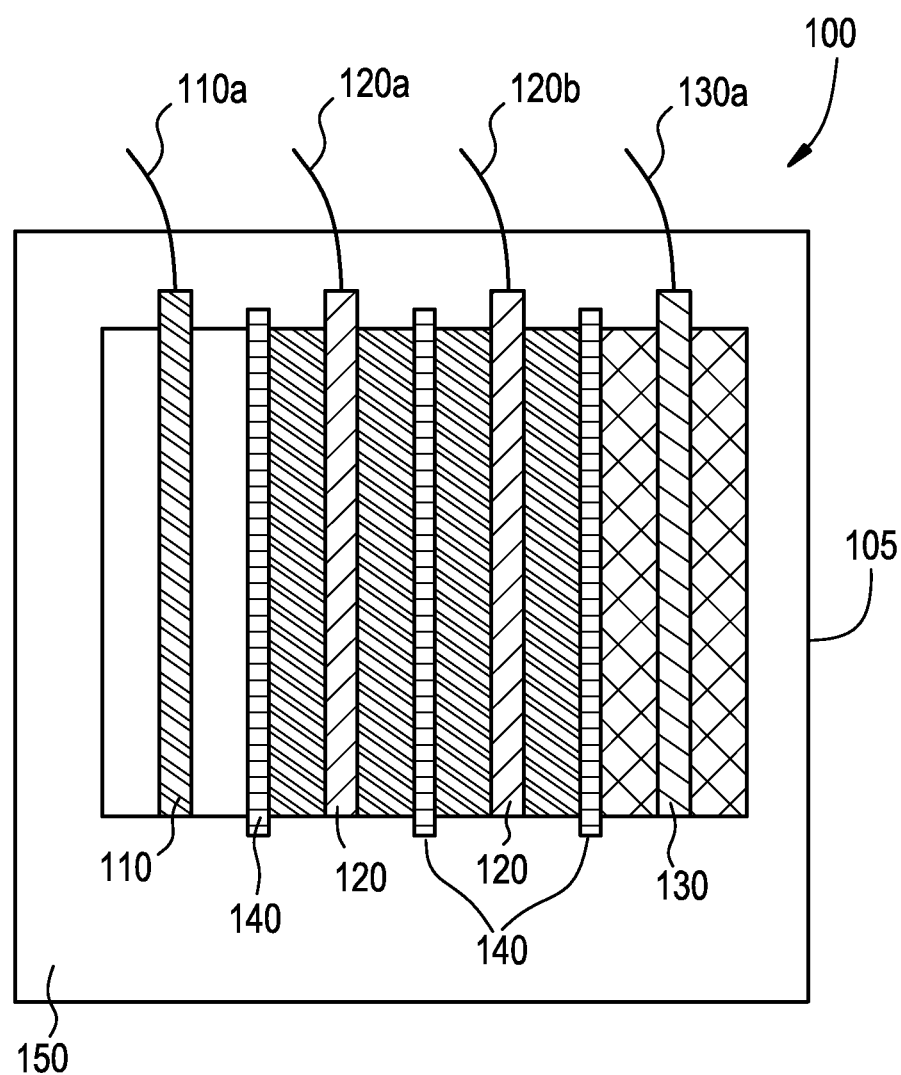
FIGS. 12A and 12B, respectively, show schematics of exemplary IEPDs.

FIG. 12A shows a schematic an exemplary IEPD device (100) having three dissimilar working electrodes including: a non-faradaic cathode (110) composition coated on both side of aluminum foil; two faradaic anode (120) composition coated on both side of copper foil; and a faradaic cathode (130) composition coated on both side of aluminum foil. The device further includes a housing or pouch casing (105), a separator member (140) situated between each of the working electrodes, an electrolyte region (150) between and surrounding each of the working electrodes, and an external connector (110a, 120a, 120b, 130a).

Figure 12B:
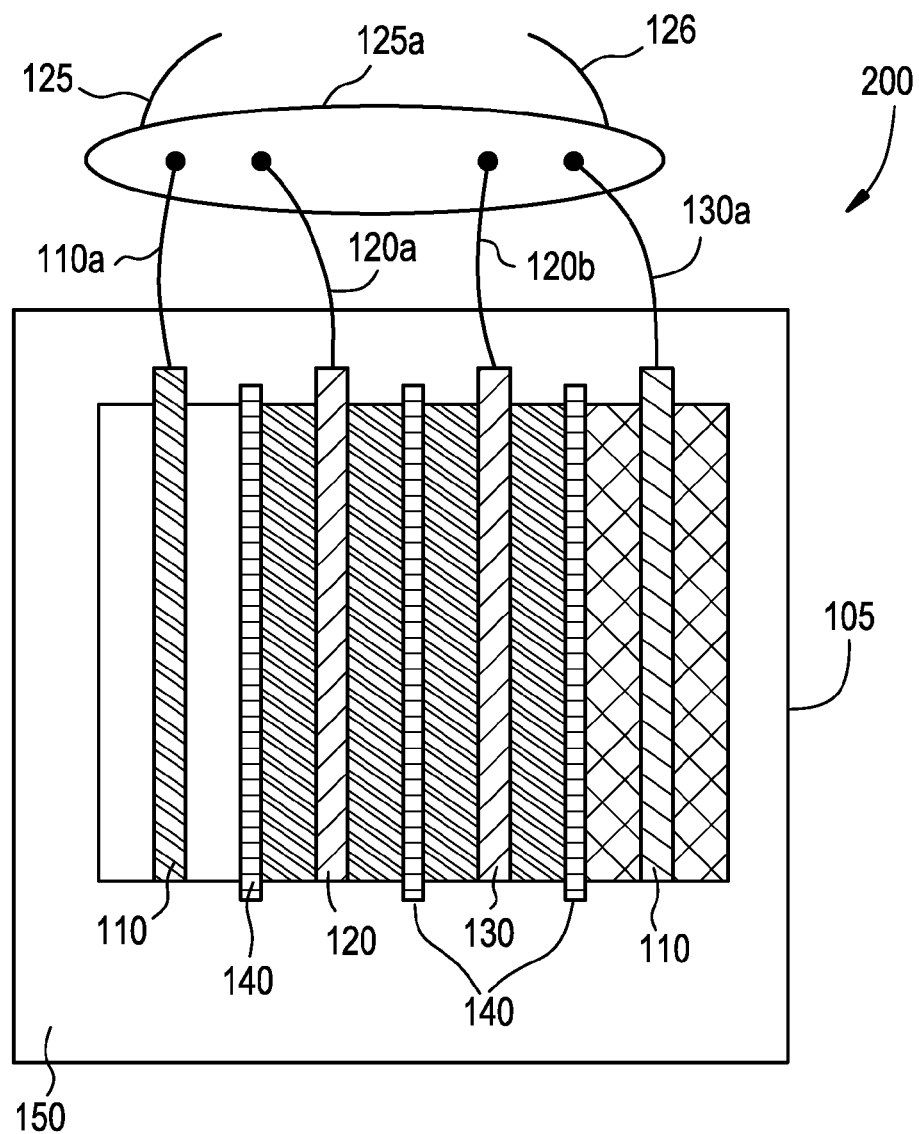

FIG. 12B shows a schematic an exemplary IEPD device (200), which is identical to the device of FIG. 12A, with the exception that external connector (110a), external connector (120a), external connector (120b), and external connector (130a) are connected together (125a). Two leads (125) and (126) are connected to the external connector (125a), and assists in switching between energy storage and power storage modes of operation.

EXAMPLES

The following Examples demonstrate making, use, and analysis of the disclosed IEPD and methods in accordance with the above general procedures.

Example 1

Hard Carbon Electrode Materials and Fabrication

The faradaic anode consisted of 90 wt % coconut shell sourced carbon (that had been previously carbonized at 1200° C., treated with HCl, and refired at 1200° C.), 5 wt % Timcal Super C-45 conductive carbon, and 5 wt % KYNAR 761 PVDF binder. The anode was made as follows: 3.6 g of coconut shell sourced carbon and 0.2 g of the conductive carbon were balled milled in a Retsch PM-100 ball mill for 10 mins at 350 rpm. 0.2 g of PVDF was added to the balled milled mixture and ball-milled for an additional 10 mins at 350 rpm. 5 mL of N-methyl pyrrolidinone (NMP) was added to the ball-milled mixture to form a slurry. The slurry was then coated on a copper foil (Product number—Oak Mitsui TLB-DS) with 50 G rod (rod coating technique). The coated electrode was dried under vacuum and at 60° C. The dried electrode was punched to the size of a pouch cell electrode. The punched electrode was then dried under vacuum at 120° C. Example 1 had five double-sided coated faradaic anode electrodes on copper foil having each side of the foil coated with the hard carbon mixture.

One of the five electrodes was spray coated with, for example, a lithium composite powder (LCP) mixture made from a THF solution of 79.6 wt % lithium metal powder, 17.8 wt % LiPF$_6$, 0.5 wt % styrene butadiene rubber, and 2.18 wt % mineral oil. The sprayed electrode was dried under vacuum at 120° C. The sprayed anode electrodes measured about 12 to 14 milli-inches in thickness. The other four electrodes had no LCP on the surface of the carbon. The sprayed anode electrode had each side of the foil coated with the hard carbon mixture, and the surface of the hard carbon mixture was coated on both sides with the lithium composite powder mixture.

The lithium composite powder (LCP) is an encapsulated lithium particle comprising: a core comprised of at least one of: lithium; a lithium metal alloy; or a combination thereof; and a shell comprised of a lithium salt, and an oil, the shell encapsulates the core, and the particle has a diameter of from 1 to 500 microns (see commonly owned and assigned U.S. Ser. No. 13/673,019, filed Nov. 9, 2012, entitled "LITHIUM COMPOSITE PARTICLES," and U.S. Ser. No. 14/493,886, filed Sep. 23, 2014, entitled "ENCAPSULATED LITHIUM PARTICLES AND METHODS OF MAKING AND USE THEREOF"). The LCP is used for pre-doping the anode.

Activated Carbon Electrode Material and Electrode Fabrication

The non-faradaic cathode material consisted of 92.5 wt % of alkali activated wheat flour sourced carbon (i.e., the above mentioned Corning carbon), 2.5 wt % Timcal Super C-45 conductive carbon, and 5 wt % KYNAR HSV 900 PVDF. The non-faradaic cathode was prepared as follows: 3.7 g of the carbon and 0.1 g of the conductive carbon were balled milled in a Retsch PM-100 ball mill for 10 mins at 350 rpm, then 0.2 g of PVDF was added to the mixture and the resulting mixture was ball-milled for 10 mins at 350 rpm. 5 ml of N-methyl pyrrolidinone (NMP) was added to the ball-milled mixture to form a slurry. The slurry was coated on a TOYAL CARBO® aluminum current collector having a thickness of about 22 microns, available from Toyo Aluminum K.K., after etching the surface of the current collector with Fluoroetch® (sodium naphthalide in glycol ether) further diluted with THF to make 5 wt % solution of Fluoroetch in THF. The coated electrode was dried under vacuum at 120° C. The dried electrode was punched to size of a pouch cell electrode and then dried under vacuum at 120° C. The cathode for Example 1 had two non-faradaic cathodes each having one side coated with the activated carbon. The cathode for Example 1 appears on the left side of FIG. 9 and includes, from left to right, the following notional structure of the formula:

C'/S/A/S/C' which notational structure corresponds to the specific components in the order listed: 830,820,140,510,530,510,140, 820,830, where "C'" is a non-faradaic cathode, C'/ is an aluminum foil (830) coated on one side with a non-faradaic cathode material (820), /A/ is a coated anode including a copper foil (530) coated on both sides with a faradaic anode material (510) (i.e., 510,530,510), /C' is 820,830, and S is a separator 140.

LiCoO$_2$ Electrodes Material and Electrode Fabrication:

The faradaic cathode consisted of 90 wt % of LiCoO$_2$, 5 wt % Timcal Super C-45 conductive carbon, and 5 wt % KYNAR 761 PVDF binder. 7.2 g of LiCoO$_2$ and 0.4 g of the conductive carbon were balled milled in a Retsch PM-100 ball mill for 10 mins at 350 rpm, then 0.4 g of PVDF binder was added to the mixture and then ball-milled for an additional 10 mins at 350 rpm. Next 4 mL of N-methyl pyrrolidinone (NMP) was added to the mixture to form a slurry. The slurry was coated on an inkless aluminum current collector. The aluminum current collector was obtained from CSI, and the ink was removed by treating the surface with 1 mL of NMP and scratching the ink off the surface of the aluminum. The coated electrode was dried under vacuum at 120° C. The dried electrodes were punched to size of a pouch cell electrode. The punched electrodes were then dried under vacuum at 120° C. Example 1 had two single-side coated faradaic cathodes, and three double-side coated cathodes represented by C/ /C/ /C/ /C/ /C where "C" is a faradaic cathode and "/" represents a coat, e.g., a "/C" or a "C/" represents a faradaic cathode coated on a single side; and "/C/" represents a cathode coated on both sides. Example 1 also had two single-side coated non-faradaic cathodes represented by C'/ and /C', where "C'" is a non-faradaic cathode, and "/" is a coat, for example, a "/C" or a "C'/" represents a non-faradaic cathode coated on a single side; and "/C'/" (not illustrated in this Example) is a faradaic cathode coated on both sides. The cathode and anode electrodes are each separated from any other adjacent electrode by a separator ("S"), and an anode ("A") electrode. The relative spatial relation or disposition of the device or the assembled cell components can be represented by the formula (I):

$$C/S\backslash A\backslash S/C/S\backslash A\backslash S/C/S\backslash A\backslash S/C/S\backslash A\backslash S/CSC'/S\backslash A\backslash S/C' \qquad (I),$$

where "\A\" is an anode that has been coated on both sides.

The abovementioned working electrodes were placed in a suitable housing in the order and number of formula (I) and as illustrated in FIG. 9, including a suitable separator inserted between each of the adjacent working electrodes. Electrolyte was added between the electrode configurations and the cell was sealed. For example, a faradaic anode electrode forms a pair with a faradaic cathode electrode separated by a separator (C/S\A\S/C), and a faradaic anode electrode forms a pair with a non-faradaic cathode electrode separated by a separator (C'/S\A\S/C').

Separator:

The separator selected was an NKK TF-4425 from Nippon Kodoshi Corporation.

Electrolyte:

The electrolyte used was 1.25 M LiPF$_6$ in a 20:20:60 by volume mixture of ethylene carbonate:dimethyl carbonate: methyl propionate, and 5 wt % by superaddition of fluoro-ethylene carbonate.

The electrode was then assembled in a power and energy combination described above, and the device properties measured.

IEPD Performance as Power Device

The IEPD of Example 1 had a discharge capacity of 64.413 mAh/gm after 10 cycles at a C/2 rate of charge and discharge between 2.2V and 3.8V during conditioning. The IEPD in Example 1 had an energy density of 15.95 Wh/l and 2019.59 Wh/l at about a 100 C rate between 2.2V and 3.8V. The IEPD in Example 1 had an energy density of 21.28 Wh/l at 1 C rate between 2.2V and 3.8V. However, depending on the selection of the electrode material composition, the operational voltage of the IEPD can be varied. For example, depending on the type of activated carbon (e.g., non-faradaic cathode) the voltage can be extended from 2.2V to 4.2V. In an illustrative example, when the purity of the activated carbon increases, such as when the oxygen content of the activated carbon declines from 2.5 wt % to 0.1 wt %, the activated carbon becomes more stable electrochemically and hence has a higher voltage window, which can decide the extension of the voltage.

IEPD Performance as an Energy Storage Battery Device

The IEPD of Example 1 had a discharge energy of 314.405 Wh/l after 5 cycles of conditioning. The conditioning profile included: first two cycles charge-discharge at about C/15; next two cycles at about C/10; and a last cycle at about C/5 between 3V and 4.2V. The IEPD of Example 1 had an energy density of 300.702 Wh/l at the first discharge cycle at 1 C, and 287.490 Wh/l after 30 cycles at 1 C rate between 3V and 4.2V. The IEPD of Example 1 had a 95.6% retention of energy density after 30 cycles. However, depending on the selection of the electrode material composition, the operational voltage of the IEPD can be varied. For example, use of lithium manganese nickel oxide as faradaic cathode can extend the operating voltage from 3V to 4.7V.

Example 2

Hard Carbon Anode Electrode Materials and Fabrication

The faradaic anode consisted of 90 wt % of the 1000° C. coconut shell sourced carbon (i.e., carbonized at 1000° C., treated with HCl, and refired at 1000° C.), 5 wt % Timcal Super C-45 conductive carbon, and 5 wt % KYNAR 761 PVDF. The anode was made as follows: 3.6 g of coconut shell sourced carbon and 0.2 g of conductive carbon were balled milled in a Retsch PM-100 ball mill for 10 mins at 350 rpm. Next 0.2 g of PVDF was added to the mixture and ball-milled for an additional 10 mins at 350 rpm. 5 ml of N-methyl pyrrolidinone (NMP) was added to the twice ball-milled mixture to form a slurry that was then coated on a copper foil (Product number—Oak Mitsui TLB-DS) with a 50 G rod (rod coating technique). The coated electrode was dried under vacuum at 60° C. and punched to the size of a pouch cell electrode.

The three faradaic working electrodes were all spray coated with the above mentioned lithium composite powder (LCP) from a mixture in THF of 79.6 wt % lithium metal powder, 17.8 wt % $LiPF_6$, 0.5 wt % styrene butadiene rubber, and 2.18 wt % mineral oil. The sprayed electrodes were dried under vacuum at 120° C. The sprayed anode electrodes had a thickness of about 15 milli-inches. The sprayed anode electrodes each had a foil having each side of the foil coated with the hard carbon mixture, and the surface of the hard carbon mixture was coated on both sides with the lithium composite powder mixture.

Activated Carbon Non-Faradaic Cathode Electrode Fabrication

The non-faradaic cathode consisted of 92.5 wt % of alkali activated wheat flour source carbon ("Corning carbon"), 2.5 wt % Timcal Super C-45 conductive carbon, and 5 wt % KYNAR HSV 900 PVDF binder. 3.7 g of the carbon and 0.1 g of the conductive carbon were balled milled in a Retsch PM-100 ball mill for 10 mins at 350 rpm, then 0.2 g of PVDF was added to the mixture and ball-milled for an additional 10 mins at 350 rpm. 5 mL of N-methyl pyrrolidinone (NMP) was added to the mixture to form a slurry, and the slurry was coated on an above mentioned TOYAL CARBO® aluminum current collector after etching the surface of the collector with Fluoroetch® containing mixture (i.e., sodium naphthalide in glycol ether further diluted with THF to make 5% solution of Fluoroetch in THF). The coated non-faradaic cathode electrode was dried under vacuum at 120° C. The dried electrode was punched to the size of a pouch cell electrode. The punched electrode was then dried under vacuum at 120° C. The cathode for Example 2 consisted of two cathodes each having one side coated with the above mentioned activated carbon composition.

$LiCoO_2$ Electrodes

The faradaic cathode consisted of 90 wt % of $LiCoO_2$, 5 wt % Timcal Super C-45 conductive carbon, and 5 wt % KYNAR 761 PVDF binder. 7.2 g of $LiCoO_2$ and 0.4 g of conductive carbon were balled milled in a Retsch PM-100 ball mill for 10 mins at 350 rpm. 0.4 g of PVDF was added to the mixture and ball-milled for an additional 10 minutes at 350 rpm. 4 mL of N-methyl pyrrolidinone (NMP) was added to the mixture to form a slurry, and the slurry was coated on an inkless aluminum current collector as mentioned in Example 1. The coated electrode was dried under vacuum at 120° C. The dried electrodes were punched to size of a pouch cell electrode and the punched electrodes were then dried under vacuum at 120° C.

The cathode of Example 2 consisted of two single-side coated faradaic cathodes and one double-sided coated faradaic cathode represented collectively by C/ /C/ /C where "C", "/C", "C/", "/C/", "S," "/C", "C/" and "\A\" are as defined above. The cathode electrodes were separated from any other cathode by a separator and an anode electrode. The relative spatial relation or disposition of device or assembled cell components can be represented by the formula (II):

C/S\A\S/C/S\A\S/CSC'/S\A\S/C'    (II).

The abovementioned faradaic anode, activated carbon non-faradaic cathode, and $LiCoO_2$ faradaic cathode working electrodes were placed in a suitable housing in the order and number of formula (II) and as illustrated in FIG. 10, including a suitable separator inserted between each of the adjacent working electrodes. Electrolyte was added between the electrodes and the cell was sealed. For example, the faradaic anode electrode forms a pair with a faradaic cathode electrode separated by a separator (C/S\A\S/C), and the faradaic anode electrode forms a pair with a non-faradaic cathode electrode separated by a separator (C'/S\A\S/C').

Separator

The separator was a NKK TF-4425 as in Example 1.

Electrolyte

The electrolyte used was as in Example 1. The electrode was assembled in a power and an energy combination described in this Example and the device properties were measured.

IEPD Performance as a Power Device

The IEPD of Example 2 had a discharge capacity of 64.689 mAh/gm after 10 cycles at C/2 rate of charge and discharge between 2.2V and 3.8V during conditioning. The IEPD of Example 2 had an energy density of 11.12 Wh/l and 1929.55 W/l at about 100 C rate between 2.2V and 3.8V. The IEPD of Example 2 had an energy density of 20.76 Wh/l at 1 C rate between 2.2V and 3.8V. However, depending on the selection of the electrode material composition, the operational voltage of the IEPD can be varied. For example, depending on the type of activated carbon (e.g., non-faradaic cathode) the voltage can be extended from 2.2V to 4.2V. In an illustrative example, when the purity of the activated carbon increases, such as when the oxygen content of the activated carbon declines from 2.5 wt % to 0.1 wt %, the activated carbon becomes more stable electrochemically and hence has a higher voltage window, which can decide the extension of the voltage.

IEPD Performance as an Energy Storage Battery Device

The IEPD of Example 2 had discharge energy of 144.980 Wh/l after 5 cycles of conditioning. The conditioning profile included first two cycles charge-discharge at about C/20, next two at about C/10 and last cycle at about C/5 between 3V and 4.2V. The IEPD of Example 2 had an energy density of 143.927 Wh/l at the first discharge cycle at 1 C and 135.429 Wh/l after 30 cycles at 1 C rate between 3V and 4.2V. The IEPD of Example 2 had a 94.095% retention of energy density after 30 cycles. However, depending on the selection of the electrode material composition the operational voltage in the IEPD can be controllably varied. For example, use of lithium manganese nickel oxide as faradaic cathode can extend the operating voltage from 3V to 4.7V.

Example 3

Hard Carbon Anode Electrode Materials and Fabrication

The faradaic anode consisted of two different kinds of electrodes having two different active materials consisting of carbonized carbon and graphite. One electrode consisted of one double-sided coated electrode made from coconut shell sourced carbon (i.e., carbonized at 1200° C., treated with HCl, and refired at 1600° C.). The other electrodes consisted of six double-side coated electrodes made from Timcal TB-17 graphite powder.

The coconut shell sourced electrode consisted of 90 wt % of the 1600° C. coconut shell sourced carbon (i.e., carbonized at 1200° C., treated with HCl, and refired at 1600° C.), 5 wt % Timcal Super C-45 conductive carbon, and 5 wt % KYNAR 761 PVDF. The anode was made as follows: 3.6 g of the coconut shell sourced carbon and 0.2 g of conductive carbon were balled milled in a Retsch PM-100 ball mill for 10 mins at 350 rpm. Next 0.2 g of PVDF was added to the mixture and ball-milled for an additional 10 mins at 350 rpm. 5 mL of N-methyl pyrrolidinone (NMP) was added to the twice ball-milled mixture to form a slurry, and the slurry was then coated on a copper foil (Product number—Oak Mitsui TLB-DS) with a 50 G rod (rod coating technique). The coated electrode was dried under vacuum at 60° C. The dried electrode was punched to the size of a pouch cell electrode and dried under vacuum at 60° C.

The coconut shell sourced electrode was spray coated with the above mentioned lithium composite powder (LCP) from a mixture in THF of 79.6 wt % lithium metal powder, 17.8 wt % LiPF$_6$, 0.5 wt % styrene butadiene rubber (SBR), and 2.18 wt % mineral oil. The sprayed electrode was dried under vacuum at 120° C. The sprayed anode electrode had a thickness of about 10 to 12 milli-inches. The sprayed coconut sourced anode electrode consisted of a copper foil having each side of the foil coated with the hard carbon mixture, and the surface of the hard carbon mixture was coated on both sides with the lithium composite powder mixture.

The Timcal graphite (TB-17) electrodes were made the same way as the coconut shell sourced electrodes except that the Timcal TB-17 graphite carbon was used in place of the coconut shell sourced carbon. The Timcal TB-17 graphite powder sourced electrodes were used with no LCP coating. The Timcal TB-17 graphite powder based electrode consisted of a copper foil having each side of the foil coated with the TB-17 graphite powder.

Activated Carbon Non-Faradaic Cathode Electrode Fabrication

The non-faradaic cathode consisted of 92.5 wt % of alkali activated wheat flour sourced carbon (i.e., Corning carbon), 2.5 wt % Timcal Super C-45 conductive carbon, and 5 wt % KYNAR HSV 900 PVDF binder. The non-faradaic cathode was prepared as follows: 3.7 g of the activated carbon and 0.1 g of the conductive carbon were balled milled in a Retsch PM-100 ball mill for 10 mins at 350 rpm, then 0.2 g of PVDF was added to the mixture and ball-milled for an additional 10 mins at 350 rpm. 5 mL of N-methyl pyrrolidinone (NMP) was added to the mixture to form a slurry, and the slurry was coated on the abovementioned TOYAL CARBO® aluminum current collector after etching the surface of the collector with a Fluoroetch® mixture (i.e., sodium naphthalide in glycol ether and further diluted with THF to make 5% solution of Fluoroetch in THF). The coated non-faradaic cathode electrode was dried under vacuum at 120° C. and punched to the size of a pouch cell electrode. The punched electrode was then dried under vacuum at 120° C. The cathode for Example 3 consisted of two cathodes each having one side coated with the activated carbon.

LiCoO$_2$ Faradaic Cathode Electrodes

The faradaic cathode consisted of 90 wt % of LiCoO$_2$, 5 wt % Timcal Super C-45 conductive carbon, and 5 wt % KYNAR 761 PVDF binder. The faradaic cathode was made as follows: 7.2 g of LiCoO$_2$ and 0.4 g of conductive carbon were balled milled in a Retsch PM-100 ball mill for 10 mins at 350 rpm. 0.4 g of PVDF was added to the mixture and ball-milled for an additional 10 minutes at 350 rpm. 4 ml of N-methyl pyrrolidinone (NMP) was added to the mixture to form a slurry, and the slurry was coated on an inkless aluminum current collector as mentioned in Example 1. The coated electrode was dried under vacuum and at 120° C. and punched to size of a pouch cell electrode. The punched electrodes were then dried under vacuum at 120° C. The faradaic cathode of Example 3 can be represented by "C/ /C/ /C/ /C/ /C/ /C/ /C/ /C" where the notation is as defined in Example 1. The relative spatial relation or disposition of the assembled cell or device components can be represented by the formula (III):

$$C/S\backslash A\backslash S/C/S\backslash A\backslash S/C/S\backslash A\backslash S/C/S\backslash A\backslash S/C/S\backslash A\backslash S/CSC'/S\backslash A\backslash S/C' \quad (III).$$

The abovementioned faradaic anode, activated carbon non-faradaic cathode, and LiCoO$_2$ faradaic cathode working electrodes were placed in a suitable housing in the order and number of formula (III) and as illustrated in FIG. 11, including a suitable separator inserted between each of the adjacent working electrodes. Electrolyte was added between the electrodes and the cell sealed. For example, the faradaic anode electrode forms a pair with a faradaic cathode electrode separated by a separator (C/S\A\S/C), and the faradaic anode electrode forms a pair with a non-faradaic cathode electrode separated by a separator (C'/S\A\S/C').

Separator

The separator was an NKK TF-4425 as in Example 1.

Electrolyte

The electrolyte used was as in Example 1.

The electrode was assembled in a power and an energy combination as described above and the device properties were measured.

The number of faradaic anodes, non-faradaic cathodes, and LiCoO$_2$ containing faradaic cathodes can be varied to provide other configurations.

IEPD Power Performance as a Power Device

The IEPD of Example 3 had a discharge capacity of 73.982 mAh/gm after 10 cycles at C/2 rate of charge and discharge between 2.2V and 3.8V during conditioning. The IEPD of Example 3 had an energy density of 18.83 Wh/l and 2452.712 W/l at about 100 C rate between 2.2V and 3.8V. The IEPD of Example 3 had an energy density of 25.55 Wh/l at 1 C rate between 2.2V and 3.8V. However, depending on the selection of the electrode material composition, the operational voltage in the IEPD can be controllably varied. For example, depending on the type of activated carbon (i.e., non-faradaic cathode) the voltage can be extended from 2.2V to 4.2V since the purity of the activated carbon can determine the extension of the voltage.

IEPD Performance as an Energy Storage Battery Device

The IEPD of Example 3 had discharge energy of 383.155 Wh/l after 5 cycles of conditioning. The conditioning profile included first two cycles charge-discharge at about C/20, next two at about C/10 and last cycle at about C/5 between 3V and 4.2V. The IEPD of Example 3 had an energy density of 356.538 Wh/l at the first discharge cycle at 1 C and 340.123 Wh/l after 30 cycles at 1 C rate between 3V and 4.2V. The IEPD of Example 3 had a 95.390% retention of energy density after 30 cycles. However, depending on the selection of the electrode material composition the operational voltage in the IEPD can be controllably varied. For example, use of lithium manganese nickel oxide in the faradaic cathode can extend the operating voltage from 3V to 4.7V since the faradaic cathode material can dictate a different voltage window.

The disclosed IEPD examples each demonstrate high discharge energy densities and high power densities. The disclosed stand-alone IEPD is capable of replacing a separate combination of a battery and a capacitor. Different materials can be selected for anodes and cathodes and the ratio of the number of anodes and cathodes can be adjusted according to the desired performance characteristics.

In embodiments, an IEPD power electrode combination can comprise, for example: an activated carbon electrode (i.e., a non-faradaic cathode); and a first graphite or hard carbon electrode (i.e., faradaic anode).

In embodiments, an IEPD energy electrode combination can comprise, for example: a graphite or hard carbon, i.e., the same as the first graphite or hard carbon, or a different graphite or hard carbon, and a $LiCoO_2$ electrode (i.e., faradaic cathode). The faradaic anodes and faradaic cathodes can be alternated and separated by separator, and same or different faradaic anodes and non-faradaic cathodes can be alternated and separated by the separator. The number of pairs of faradaic anodes paired with faradaic cathodes, and the number of pairs of faradaic anodes paired with non-faradaic cathodes can be adjusted depending on the application of the device.

The examples demonstrate the feasibility and operability of the disclosed integrated energy power device, which device can be structurally or dimensionally adjusted during its construction for desired energy, power, or both energy and power applications.

The disclosure has been described with reference to various specific embodiments and techniques. However, it should be understood that many variations and modifications are possible while remaining within the scope of the disclosure.

What is claimed is:

1. A lithium ion energy and power system comprising:
   a housing containing:
      at least four electrodes comprising:
         at least one first electrode comprising a cathodic faradaic energy storage material;
         at least one second electrode comprising an anodic faradaic energy storage material;
         at least one third electrode comprising a cathodic non-faradaic energy storage material; and
         at least one fourth electrode comprising a second anodic faradaic energy storage material, wherein the at least one first electrode comprising a cathodic faradaic energy storage material is adjacent to the at least one second electrode comprising an anodic faradaic energy storage material, the at least one third electrode comprising a cathodic non-faradaic energy storage material is adjacent to the at least one second electrode comprising an anodic faradaic energy storage material, the at least one fourth electrode comprising a second anodic faradaic energy storage material is adjacent to the at least one third electrode comprising a cathodic non-faradaic energy storage material, and the at least one second electrode comprising an anodic faradaic energy storage material is electrically isolated from the at least one fourth electrode;
      a separator situated between each of the adjacent electrodes; and
      a liquid electrolyte between each of the adjacent electrodes.

2. The system of claim 1 wherein the cathodic faradaic energy storage material in the first electrode comprises a lithium transition metal complex, the anodic faradaic energy storage material in the second electrode comprises an intercalating hard carbon or graphite having a low surface area of from 1 to 500 $m^2/g$, and the cathodic non-faradaic energy storage material in the third electrode comprises a carbon having a high surface area of from 800 to 3000 $m^2/g$.

3. The system of claim 1 wherein:
   the cathodic faradaic energy storage material is a lithium transition metal complex selected from the group of: $LiCoO_2$, $LiMn_{1.5}Ni_{0.5}O_4$, $LiMn_2O_4$, $LiFePO_4$, $LiNiMnCoO_2$, $LiNiCoAlO_2$, or a mixture thereof;
   the anodic faradaic energy storage material is selected from the group of: silicon nanoparticles; porous silicon; tin nanoparticles; graphene; a vanadium oxide sourced compound; a carbon nanotube; a titanium oxide sourced compound; germanium; antimony; a graphite carbon; a hard carbon; or a mixture of thereof; and
   the cathodic non-faradaic energy storage material is selected from the group of: activated carbon having a surface area of from 800 to 3000 $m^2/gm$ and the activated carbon is from 51 to 100 wt % of the total active material in at least one third electrode; a mixture of activated carbon and graphite; a mixture of activated carbon and a hard carbon; or a mixture thereof.

4. The system of claim 1 wherein the cathodic faradaic energy storage material, the cathodic non-faradaic energy storage material, and the anodic faradaic energy storage material comprise components that have a relative spatial relation represented by at least one of the formulas (I), (II), or (III):

$$C/S\backslash A\backslash S/C/S\backslash A\backslash S/C/S\backslash A\backslash S/C/S\backslash A\backslash S/CSC'/S\backslash A\backslash S/C' \quad (I);$$

$$C/S\backslash A\backslash S/C/S\backslash A\backslash S/CSC'/S\backslash A\backslash S/C' \quad (II);$$

$$C/S\backslash A\backslash S/C/S\backslash A\backslash S/C/S\backslash A\backslash S/C/S\backslash A\backslash S/C/S\backslash A\backslash S/ CSC'/S\backslash A\backslash S/C' \quad (III),$$

where "C" is a faradaic cathode, "C'" is a non-faradaic cathode, "\" is a single-side coat, "\C\" is a faradaic cathode coated on both sides, "S" is a separator, and "\A\" is a faradaic anode coated on both sides.

5. The system of claim 1 wherein at least two of the at least four electrodes comprise a plurality of cathodic faradaic energy storage material electrodes and a plurality of cathodic non-faradaic energy storage material electrodes, where the ratio of the number of cathodic faradaic electrodes to the number of cathodic non-faradaic electrodes is from 0.01 to 50.

6. The system of claim 1 further comprising an external connector for each electrode, or an external connector for each group of two or more identical electrodes.

7. The system of claim 6 further comprising an external switch connected to each external connector for each electrode, or for each group of two or more identical electrodes.

8. The system of claim 1 wherein the anodic faradaic energy storage material is coated on a copper foil current collector, and the cathodic faradaic energy storage material and the cathodic non-faradaic energy storage material are each separately coated on an aluminum foil current collector.

9. The system of claim 1 wherein the electrolyte is selected from at least one of: a $LiPF_6$ in a non-aqueous solvent; an onium salt and a non-aqueous solvent; or a combination thereof.

10. The system of claim 1 wherein the electrolyte comprises a quaternary ammonium cation and a tetrafluoroborate anion, and a non-aqueous solvent selected from at least one of: a nitrile, an alkyl ester, a sulfone, an ether, a dialkyl carbonate, a dialkylene carbonate, a fluorinated dialkylene carbonate, a or a mixture thereof.

11. The system of claim 1 wherein the at least four electrodes comprise:
the at least one first electrode includes a lithium containing compound;
the at least one second electrode and the at least one fourth electrode each includes at least one of a hard carbon, a graphite, or a mixture thereof; and
the at least one third electrode includes an activated carbon having a high porosity of from 0.2 to 1.5 $cm^3/gm$ and a high surface area of from 800 to 3000 $m^2/g$, wherein the at least one first electrode is adjacent to the at least one second electrode, and the at least one third electrode is adjacent to the fourth electrode.

12. The system of claim 1 wherein the lithium ion energy component of the system has an energy density from 20 Wh/l to 500 Wh/l, and the power component of the system has a power of from 200 W/l to 20,000 W/l.

13. A method of using the system of claim 1, comprising:
charging, discharging, or charging and discharging the system as a battery;
charging, discharging, or charging and discharging the system as a capacitor;
or a combination thereof.

14. The method of claim 13 further comprising using the system in combination with at least one of: a vehicle, an electronic appliance, a consumer electronic device, a wind turbine, a wave-action turbine, a component of an electrical grid system, or a combination thereof.

15. An energy system having integral energy and power components, comprising:
a single housing containing at least four electrodes comprising:
at least one first electrode comprising a lithium transition metal compound;
at least one second electrode and at least one fourth electrode each comprising an un-activated carbon; and
at least one third electrode comprising an activated carbon, wherein the at least one first electrode is adjacent to the at least one second electrode, and the at least one third electrode is adjacent to and between the at least one second electrode and the at least one fourth electrode, and the un-activated carbon of at least one second electrode and at least one fourth electrode is electrically isolated; and
a separator between each of the electrodes; and
a single electrolyte between each of the electrodes.

16. The system of claim 15 wherein the lithium transition metal compound in the at least one first electrode comprises a lithium transition metal salt complex, the un-activated carbon in the at least one second electrode and the at least one fourth electrode comprises a carbon having a low surface area of from 1 to 500 $m^2/g$, and the activated carbon in the at least one third electrode comprises an activated carbon having a high surface area of from 800 to 3000 $m^2/g$.

17. The system of claim 15 wherein the single electrolyte comprises a salt selected from a quaternary ammonium tetrafluoroborate compound or a $LiPF_6$ compound, and a non-aqueous solvent selected from at least one of: a nitrile, an alkyl ester, a sulfone, an ether, a dialkyl carbonate, a dialkylene carbonate, a fluorinated dialkylene carbonate, or a mixture thereof.

18. An integrated energy and power device comprising:
at least four electrodes arranged in a power electrode combination and an energy electrode combination, wherein the power electrode combination operates at from 2.2 to 3.8 V, and the energy electrode combination operates at from 3.0 to 4.2 V, wherein at least one second electrode and at least one fourth electrode are electrically isolated.

19. The device of claim 18 wherein:
the power electrode combination comprises at least one electrode containing an activated carbon paired with at least one electrode containing a first graphite or a first hard carbon; and
the energy electrode combination comprises at least one electrode containing a first graphite, or a first hard carbon, paired with at least one electrode having a lithium compound.

20. The device of claim 19 wherein:
in the power electrode combination the first graphite or the first hard carbon containing electrode has a surface area of from 10 to 300 $m^2/gm$, and the activated carbon containing electrode has a surface area of 500 to 2,000 $m^2/gm$; and
in the energy electrode combination the first graphite or the first hard carbon has a surface area of from 10 to 300 $m^2/gm$, and the electrode containing a lithium compound includes a $LiCoO_2$ compound.

* * * * *

UNITED STATES PATENT AND TRADEMARK OFFICE
CERTIFICATE OF CORRECTION

PATENT NO. : 10,014,704 B2
APPLICATION NO. : 14/610706
DATED : July 3, 2018
INVENTOR(S) : Gadkaree et al.

It is certified that error appears in the above-identified patent and that said Letters Patent is hereby corrected as shown below:

On the Title Page

On page 2, Column 2, item (56), other publications, Line 8, delete "bsattery-" and insert -- battery- --, therefor.

In the Claims

In Column 22, Line 58, Claim 4, delete ""\"" and insert -- "/" --, therefor.

In Column 22, Line 58, Claim 4, delete ""\C\"" and insert -- "/C/" --, therefor.

In Column 23, Line 22, Claim 10, delete "a or" and insert -- or --, therefor.

Signed and Sealed this
Nineteenth Day of April, 2022

Katherine Kelly Vidal
*Director of the United States Patent and Trademark Office*